(12) United States Patent
Matic

(10) Patent No.: US 12,031,787 B2
(45) Date of Patent: Jul. 9, 2024

(54) SHOOTING REST ASSEMBLY WITH RESISTANCE CONTROL

(71) Applicant: MATIC OUTDOORS, LLC, Chardon, OH (US)

(72) Inventor: Miso Matic, Chardon, OH (US)

(73) Assignee: MATIC OUTDOORS, LLC, Chardon, OH (US)

( * ) Notice: Subject to any disclaimer, the term of this patent is extended or adjusted under 35 U.S.C. 154(b) by 102 days.

(21) Appl. No.: 17/931,208

(22) Filed: Sep. 12, 2022

(65) Prior Publication Data

US 2024/0085137 A1    Mar. 14, 2024

(51) Int. Cl.
*F41A 23/16*    (2006.01)
*F16M 13/02*    (2006.01)

(52) U.S. Cl.
CPC ........... *F41A 23/16* (2013.01); *F16M 13/022* (2013.01)

(58) Field of Classification Search
CPC .............................. F41A 23/16; F16M 13/022
USPC ............................................................ 42/94
See application file for complete search history.

(56) References Cited

U.S. PATENT DOCUMENTS

| | | | |
|---|---|---|---|
| 3,958,904 A | 5/1976 | Rushbach | |
| 4,937,965 A * | 7/1990 | Narvaez | F41A 23/02 |
| | | | 42/94 |
| 5,081,782 A * | 1/1992 | Wright | F41A 23/16 |
| | | | 42/94 |
| 5,149,900 A * | 9/1992 | Buck | F41A 23/02 |
| | | | 248/122.1 |
| 5,194,678 A | 3/1993 | Kramer | |
| 5,414,949 A * | 5/1995 | Peebles | F41A 23/16 |
| | | | 89/37.04 |
| 5,481,817 A * | 1/1996 | Parker | F41A 23/02 |
| | | | 248/286.1 |
| 5,913,667 A * | 6/1999 | Smilee | F41A 23/06 |
| | | | 42/94 |
| 7,415,790 B1 * | 8/2008 | Ruhland | F41A 27/06 |
| | | | 89/37.01 |
| 7,635,119 B1 | 12/2009 | Patel | |
| 7,658,140 B2 | 2/2010 | Lombardi | |
| 7,730,824 B1 | 6/2010 | Black | |
| 7,770,319 B2 | 8/2010 | McDonald | |
| 7,975,973 B1 | 7/2011 | Weeden | |
| 7,980,017 B2 | 7/2011 | Harman, III | |
| 8,109,028 B2 | 2/2012 | Roberts et al. | |
| 8,297,605 B2 | 10/2012 | Lee et al. | |
| 8,307,576 B1 | 11/2012 | Bogart et al. | |
| 8,739,452 B1 | 6/2014 | Calvert | |

(Continued)

FOREIGN PATENT DOCUMENTS

| | | |
|---|---|---|
| CA | 2 901 261 A1 | 2/2017 |
| DE | 10 2016 112 444 B3 | 4/2017 |

(Continued)

*Primary Examiner* — Jonathan C Weber
(74) *Attorney, Agent, or Firm* — McDonald Hopkins LLC

(57) ABSTRACT

A shooting rest including a swivel having a piston and a cup that is dimensioned to pivot about the piston. The cup is attached to a yoke via an arm, and the shooting rest includes a housing with a first end and a second end spaced apart by a side wall. A seat is formed in the first end of the housing and is dimensioned to accommodate the piston. A resistance control including a rod is extended into an opening of the side wall and is operable to modulate the frictional resistance between the piston and the cup.

16 Claims, 23 Drawing Sheets

(56) References Cited

U.S. PATENT DOCUMENTS

| | | |
|---|---|---|
| 9,546,839 B1 | 1/2017 | Hancosky |
| 9,568,265 B2 | 2/2017 | Bastian, Jr. |
| 10,398,139 B2 | 9/2019 | Wynalda, Jr. et al. |
| 10,473,151 B2 | 11/2019 | Wynalda, Jr. et al. |
| 10,474,013 B2 | 11/2019 | Wynalda, Jr. et al. |
| 10,660,326 B2 | 5/2020 | Lebire |
| 10,859,336 B2 | 12/2020 | Morrow et al. |
| 10,962,321 B2 | 3/2021 | Wynalda, Jr. et al. |
| 2010/0223832 A1 | 9/2010 | Lombardi |
| 2011/0101192 A1* | 5/2011 | Lee ............... F16M 11/041 |
| | | 248/346.03 |
| 2021/0033244 A1 | 2/2021 | Wynalda |
| 2021/0293504 A1 | 9/2021 | Wynalda |
| 2022/0248661 A1 | 8/2022 | Wynalda, Jr. |
| 2022/0248662 A1 | 8/2022 | Wynalda, Jr. |
| 2023/0063925 A1 | 3/2023 | Wynalda, Jr. et al. |

FOREIGN PATENT DOCUMENTS

| | | |
|---|---|---|
| EP | 2 455 698 A2 | 5/2012 |
| GB | 111655 | 1/1917 |
| IT | BO20130249 A1 | 11/2014 |

\* cited by examiner

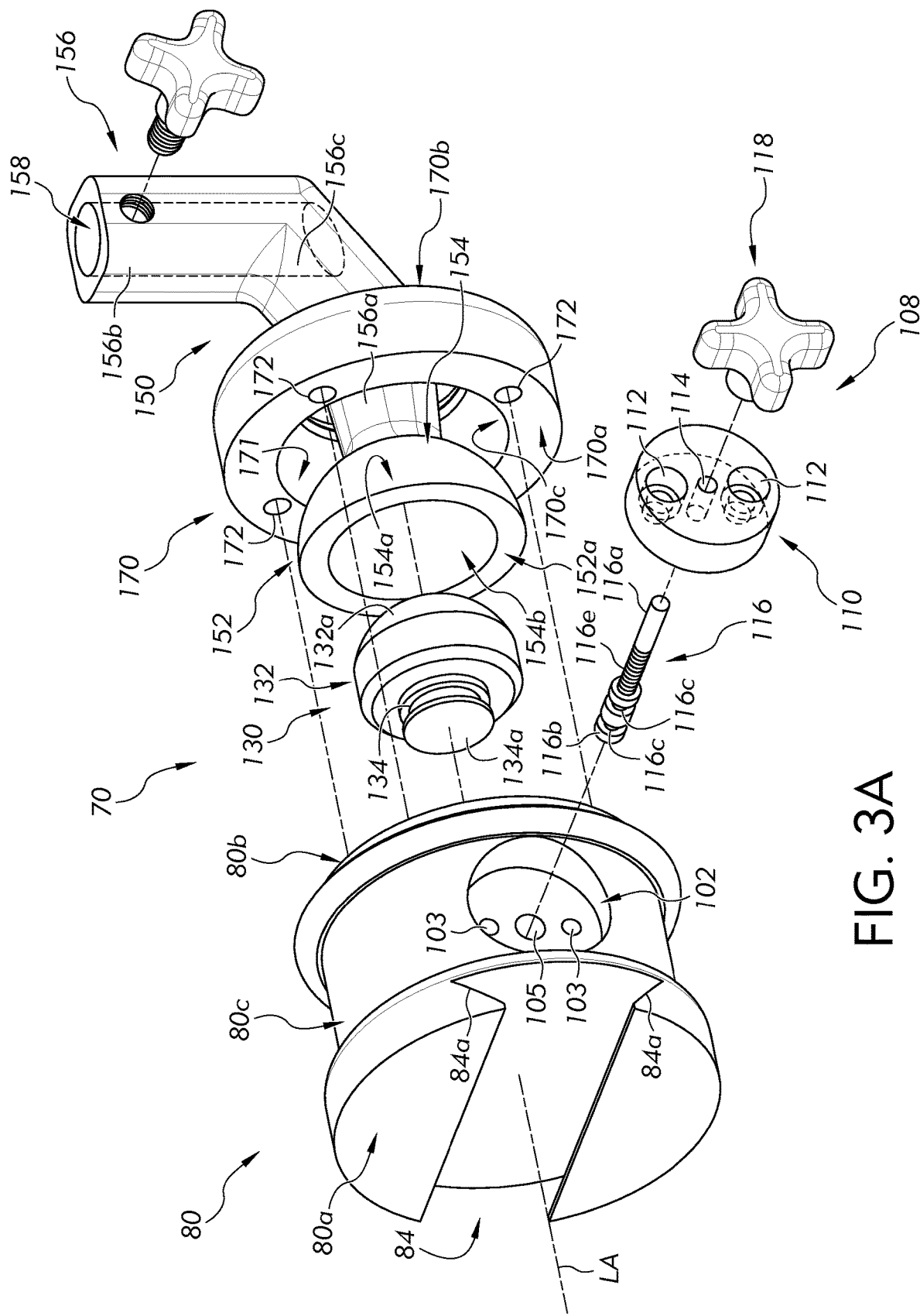

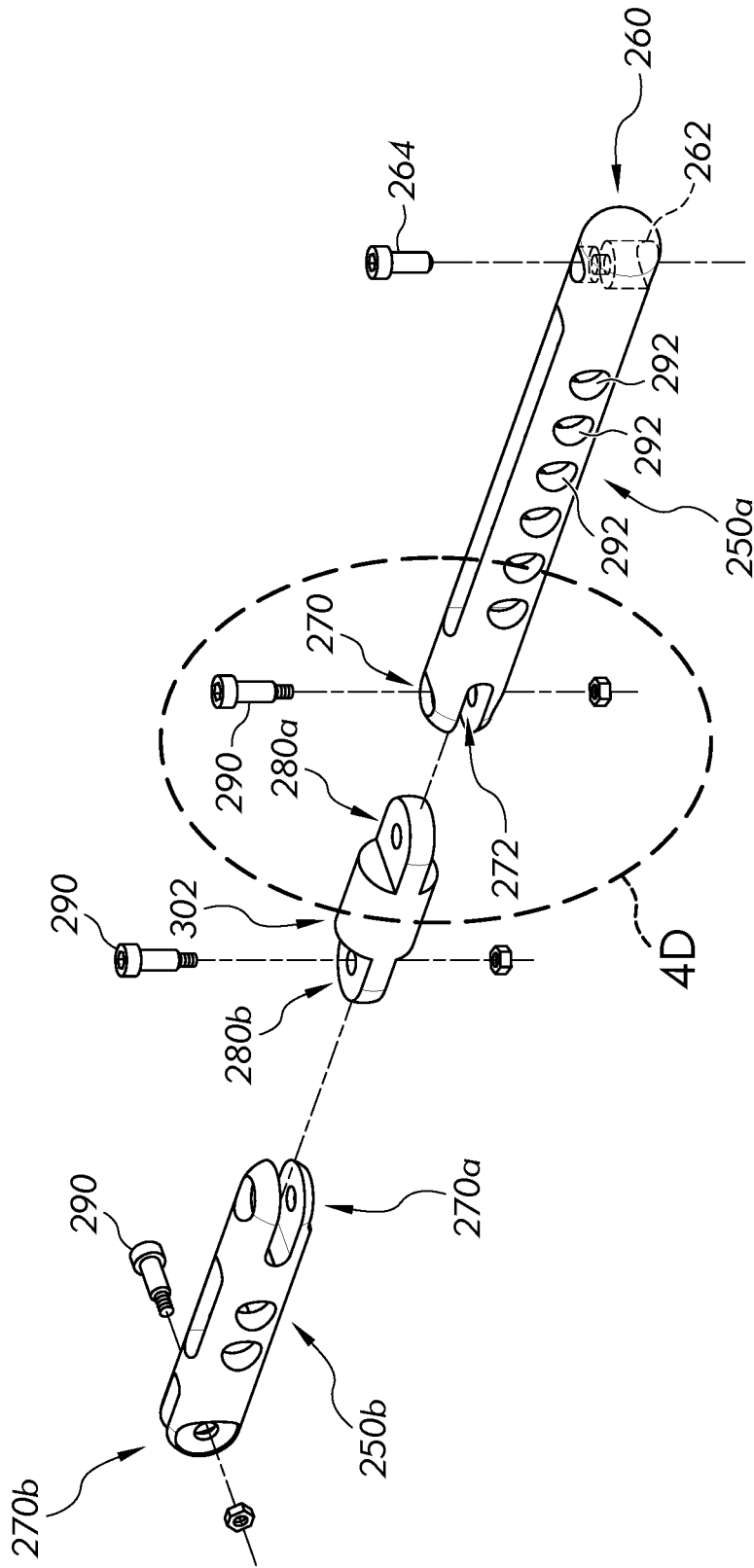

SHOOTING REST ASSEMBLY WITH RESISTANCE CONTROL

FIELD OF THE INVENTION

This application generally relates to a shooting rest, and more particularly, a shooting rest with a swivel assembly featuring a novel resistance control.

BACKGROUND

Hunting requires the mastery of many skills, including concentration, patience, and accuracy. Many hunters claim that accuracy is the most critical of these skills. Accurately shooting a weapon (e.g., a rifle or crossbow) requires the hunter to steadily hold the weapon when aiming at a target. However, this may prove challenging for many hunters, especially those with weak muscles or joint issues. Shooting rests were developed to help alleviate some of these issues. However, conventional shooting rests offer limited benefits when it becomes necessary to reposition a weapon to aim at a moving target. Some shooting rests include pivot joints that facilitate changing the orientation of the weapon. However, such shooting rests suffer from the following inadequacies. First, readjusting the orientation of the weapon requires the user to manually unclamp or unlock the pivot joint to move the weapon, which is not only cumbersome but time-consuming. Indeed, the time spent to unlock or unclamp the pivot joint may cause the hunter to lose sight of a moving target.

In addition, when unclamped or unlocked, such conventional pivot joints are freely rotatable, which may cause the weapon to be suddenly jerked due to the weight thereof or the hunter's inability to hold the weapon steadily. This may also cause the hunter to lose sight of the moving target. Therefore, it is desirable to have a shooting rest that allows the hunter to reposition the weapon more easily when aiming at a moving target.

SUMMARY OF THE INVENTION

The following presents a simplified summary of the disclosure in order to provide a basic understanding of some example aspects described in the detailed description. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

In accordance with one aspect, there is provided a swivel assembly for a shooting rest. The swivel assembly includes a housing, a piston, a cup, and a resistance control. The housing includes a cavity containing a fluid therein. The housing also defines a seat and a first opening extending into the cavity. The piston is dimensioned to be received by the seat and defines a spherical-shaped portion. The cup defines a concaved inner surface corresponding to the spherical-shaped portion of the piston. Further, the resistance control includes a rod extending into the first opening and operable to compress the fluid in the cavity to variably modulate friction between the spherical-shaped-portion of the piston and the concaved inner surface of the cup.

In accordance with another aspect, there is provided a shooting rest assembly including a swivel assembly, an arm, and a yoke. The swivel assembly includes a housing with a cavity containing a fluid therein. The housing includes a first end and a second end spaced apart by a side wall. The side wall defines a first opening extending into the cavity and the first end of the housing includes a seat defining a second opening extending into the cavity. The swivel assembly also includes a piston defining a spherical shaped-portion. A stem extends from the piston at an opposite side of the spherical-shaped portion and is shaped and dimensioned to be received by the seat of the housing. Further, the swivel assembly includes a pivotable support body including a holder extending therefrom and a cup defining a concaved inner surface corresponding to the spherical-shaped portion of the piston. In addition, the swivel assembly includes a resistance control including a rod extending into the cavity through the first opening and operable to compress the fluid in the cavity to variably modulate friction between the spherical-shaped-portion of the piston and the concaved inner surface of the cup. The arm is removably attached to the holder of the pivotable support body and the yoke is removably attached to the arm. The yoke is configured to support a weapon thereon.

BRIEF DESCRIPTION OF THE DRAWINGS

These and other features, aspects and advantages of the present disclosure can be further understood when read with reference to the accompanying drawings:

FIG. 3A is an enlarged, exploded rear perspective view of an example swivel assembly according to an embodiment;

FIG. 4C is an enlarged, exploded perspective view of example first and second arms and a link of the articulating arm assembly of FIG. 4A;

DETAILED DESCRIPTION

Figure 1A:
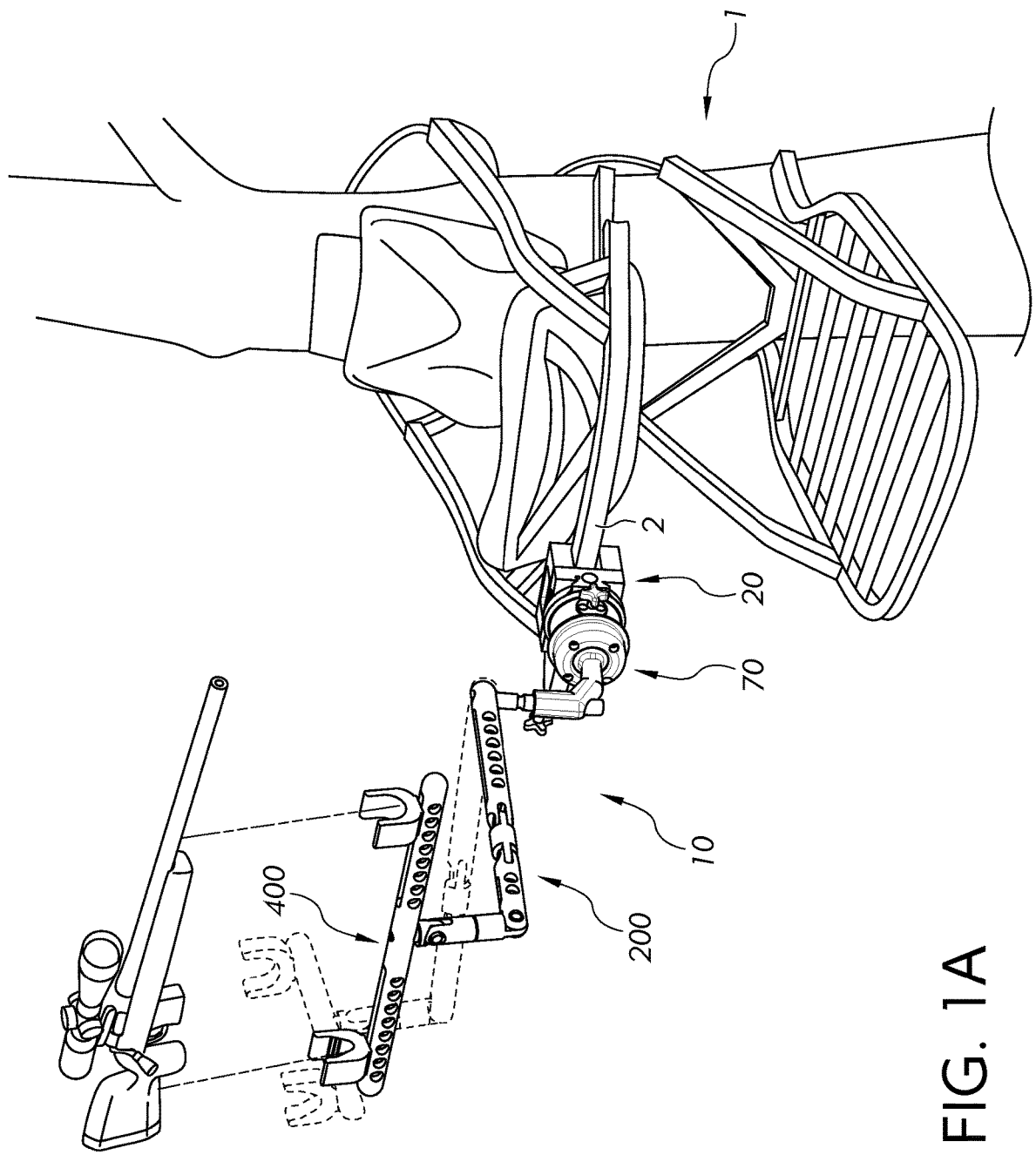
FIG. 1A is a front perspective view of an example shooting rest assembly attached to a hunting tree climber according to an embodiment.

Apparatus will now be described more fully hereinafter with reference to the accompanying drawings in which embodiments of the disclosure are shown. Whenever possible, the same reference numerals are used throughout the drawings to refer to the same or like parts. However, this disclosure may be embodied in many different forms and should not be construed as limited to the embodiments set forth herein.

Referring now to the drawings, an example shooting rest assembly will now be described that may be removably attached to hunting tree stands (e.g., tree climbers, ladder stands, and the like) and vehicles (e.g., all-terrain vehicles (ATVs), pickup trucks). It should be appreciated that the various inventions described herein may be adapted for use with other products or devices, for example, hunting blinds, ground mounts, bipods, and tripods.

Figure 6:
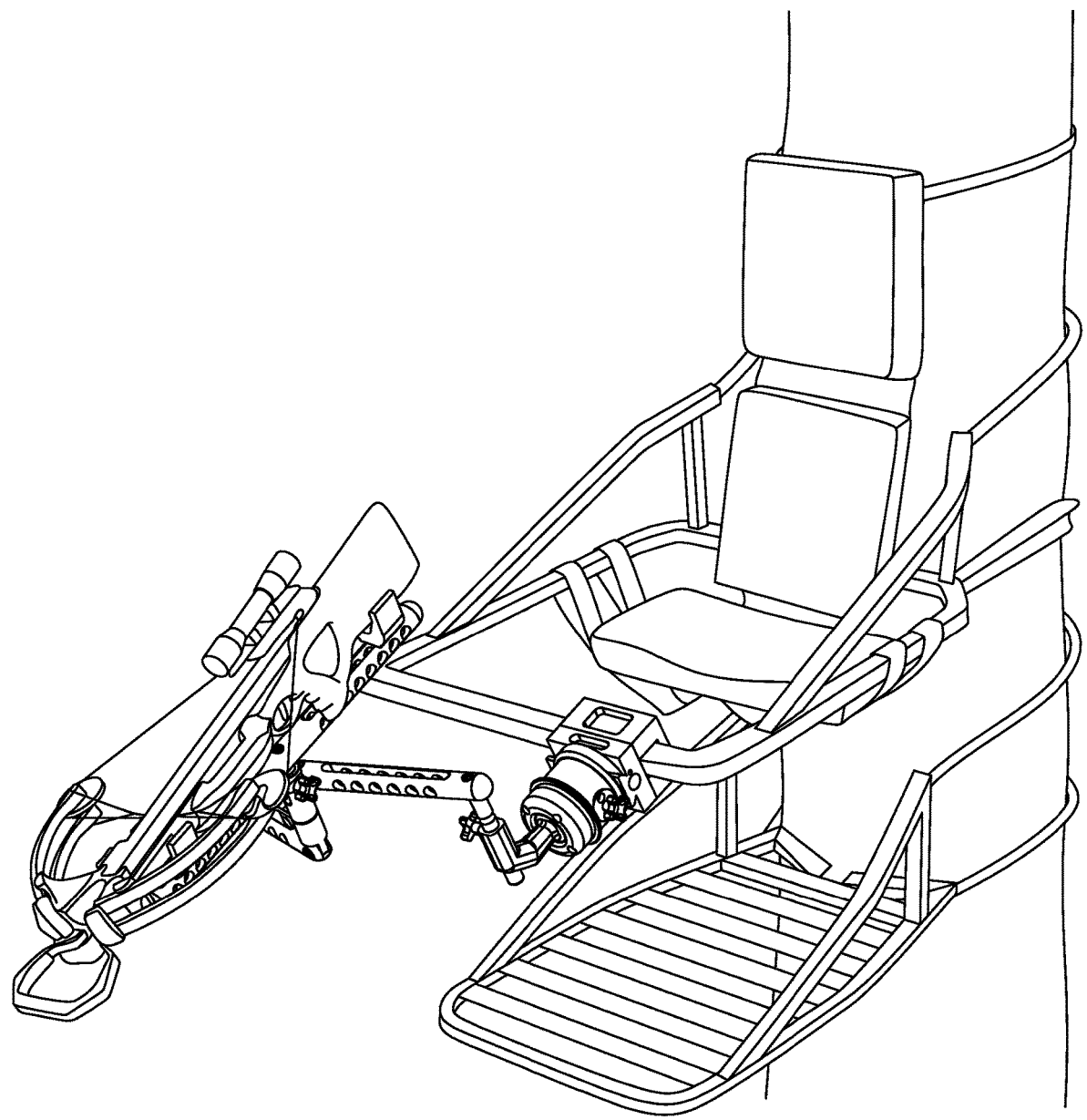
FIG. 6 is a front perspective view of the shooting rest assembly of FIG. 1 shown supporting a crossbow.

Moreover, while the example illustrations depict a shooting rest assembly for supporting a hunting rifle (FIG. 1) or a crossbow (FIG. 6), it should be appreciated that the various inventions described herein may be adapted to support other kinds of weapons (e.g., shotguns, military assault rifles, etc.) and/or devices, e.g., cameras for capturing photos or video.

Figure 1B:
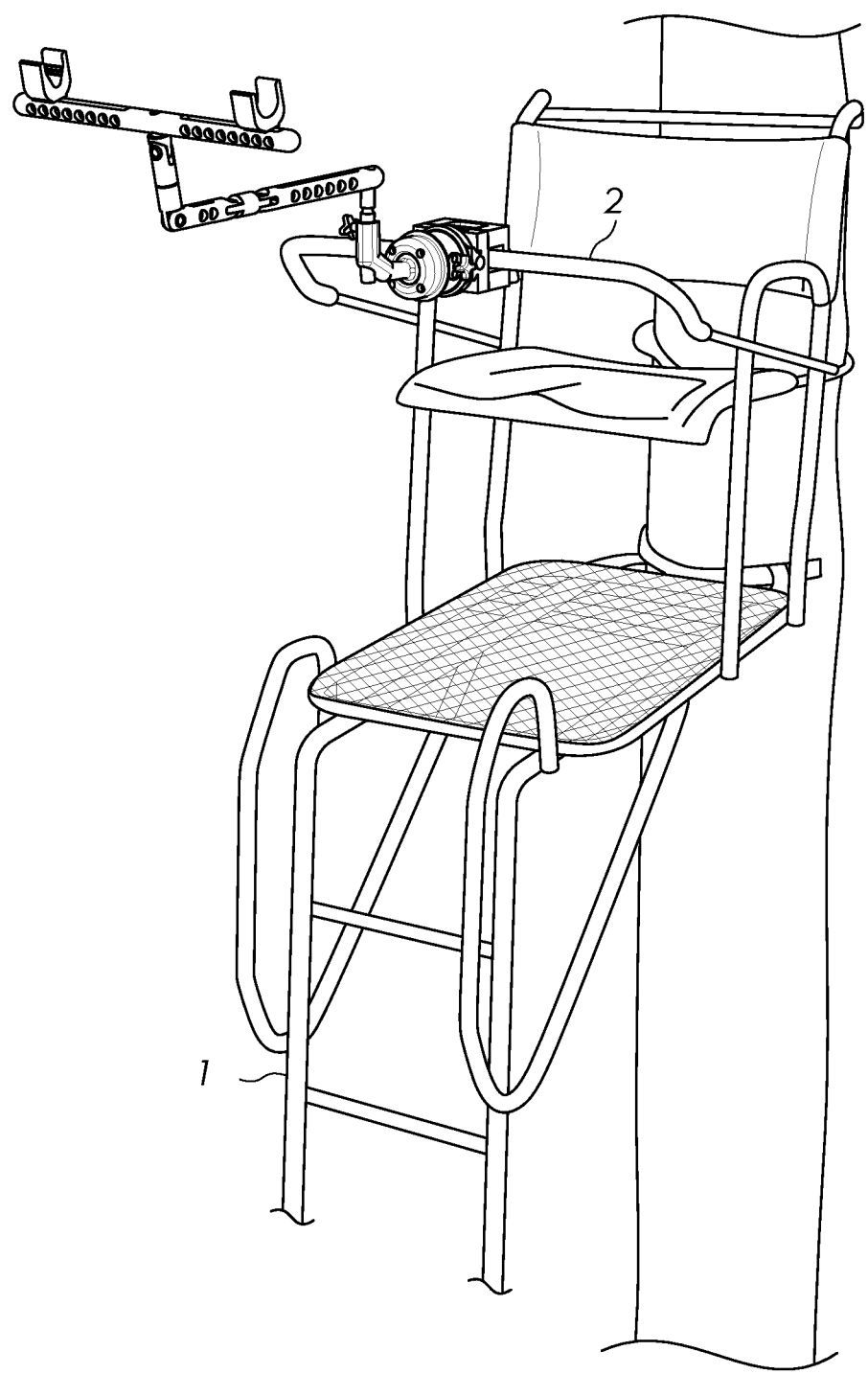
FIG. 1B is a front perspective view of the example shooting rest assembly of FIG. 1A attached to a hunting ladder stand.
Figure 2A:
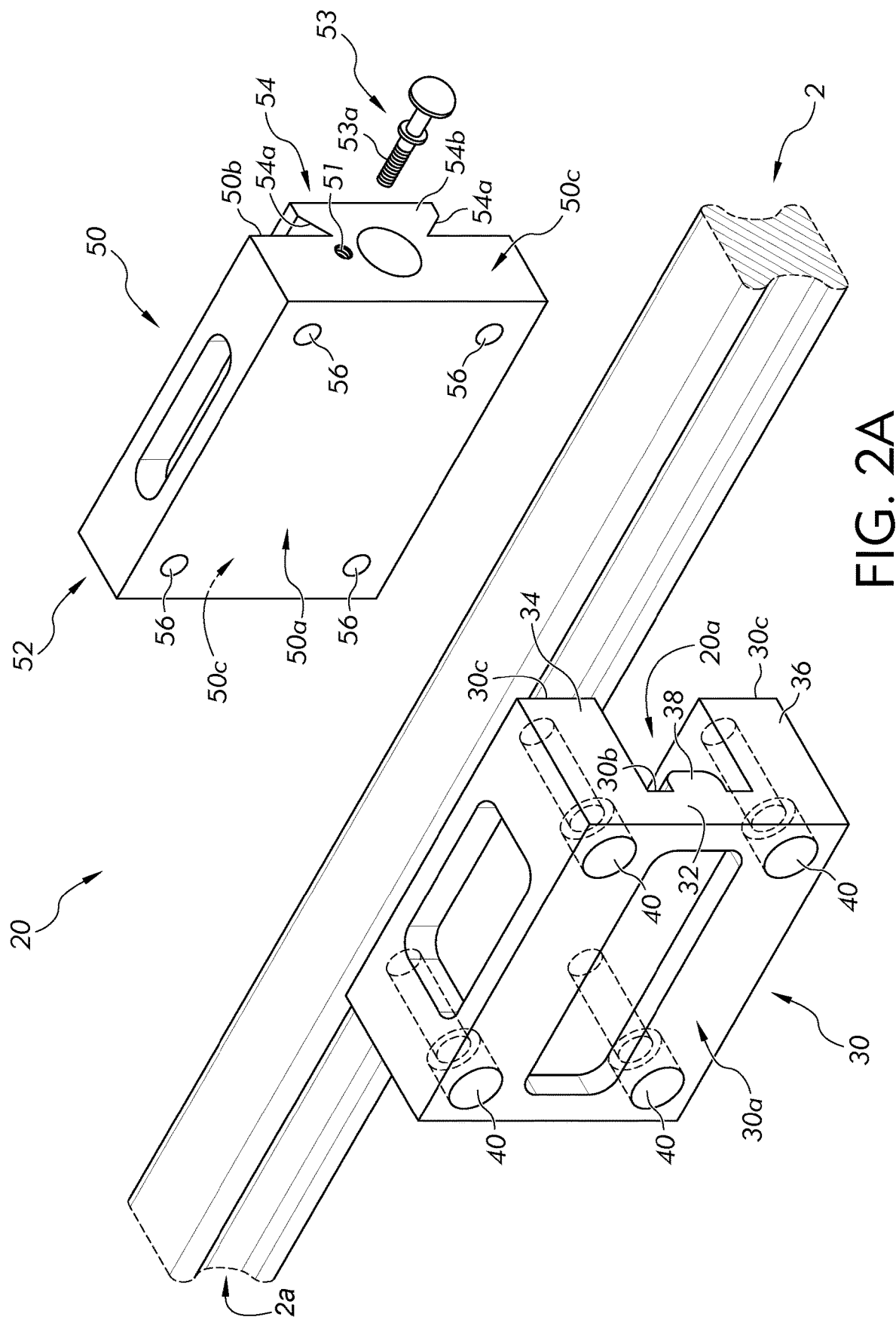
FIG. 2A is an enlarged, exploded rear perspective view of an example bracket assembly according to a first embodiment shown in relation to an example rail of a hunting stand.
Figure 2B:
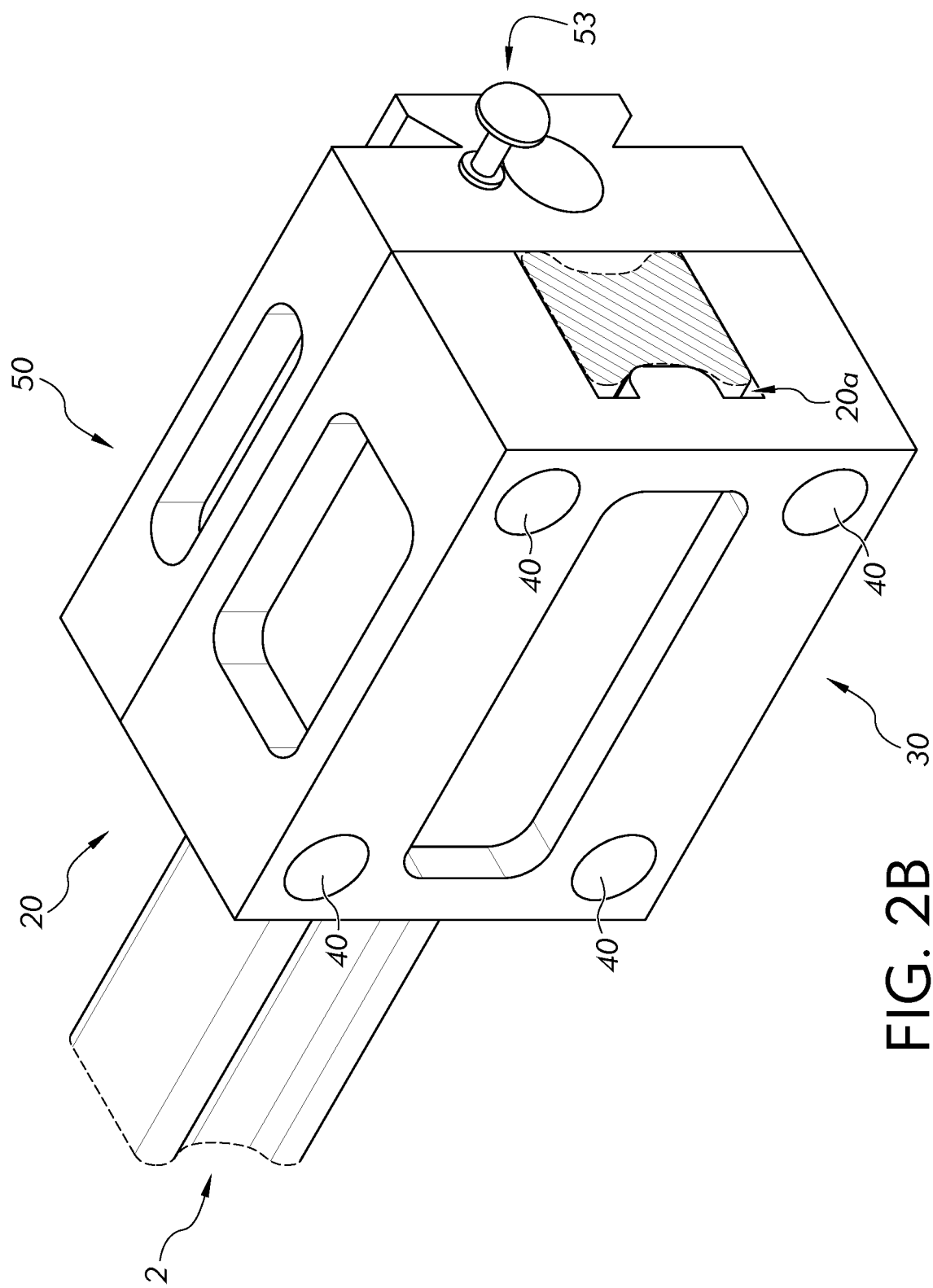
FIG. 2B is an enlarged, rear perspective view of the bracket assembly of FIG. 2A attached to the rail of FIG. 2A shown in partial sectional.

FIGS. 1A and 1B each illustrate a perspective view of a shooting rest assembly 10 removably attached to the front rail 2 of a hunting stand 1, depicted as a tree climber in FIG. 1A and as a ladder stand in FIG. 1B. The shooting rest assembly 10, in general, includes a bracket assembly 20, a swivel assembly 70, an articulating arm assembly 200, and a yoke assembly 400. As shown in FIGS. 2A and 2B, the bracket assembly 20, according to a first embodiment, comprises structure for attaching the shooting rest assembly 10 to the front rail of the hunting stand.

Specifically, the bracket assembly 20 includes a first member 30 and a second member 50 that collectively define a channel 20a that is shaped and dimensioned to receive and engage with a rail 2 of the hunting stand. The first and second members 30 and 50 are made of rigid material of suitable strength and preferably a corrosion-resistant metal such as Aluminum 6061-T6 material. With reference to FIG. 2A, the first member 30 comprises a cross-section (taken perpendicular to a rear planar surface 30a of the first member 30) that is substantially C-shaped such that the first member 30 partially encloses the rail 2 when attached thereto. Specifically, the first member 30 may comprise a vertical wall 32 with elongated first and second legs 34 and 36 spaced apart and extending substantially parallel and away from the vertical wall 32 (at a right angle therefrom) to partially define the channel 20a of the bracket assembly 20.

An elongated protrusion 38 may be formed on an inner surface 30b of the vertical wall 32 between the first and second legs 34 and 36 and extend inwardly in the same direction of the legs 34 and 36. Specifically, the protrusion 38 is shaped and dimensioned to engage with a mating recess 2a formed in the rail 2, thereby firmly supporting the shooting rest assembly 10 to the rail 2. It is contemplated that the protrusion 38 may be shaped and dimensioned to universally mesh with a wide variety of recesses formed in rails of various tree climbers and/or ladder stands.

Still referring to FIGS. 2A and 2B, a plurality of mounting holes 40 may be formed in the first member 30 and extend between a rear surface 30a thereof and distal ends 30c of the first and second legs 34 and 36, respectively. In the illustrated embodiment, the mounting holes 40 are depicted as counterbores and there are a total of four mounting holes. However, it is contemplated that the mounting holes may be different in number, form, and location without departing from the scope of the present disclosure.

Referring to FIG. 2A, the second member 50 comprises a rectangular-shaped body 52 with a rear surface or first end 50a and a front surface or second end 50b spaced apart by a thickness of the body 52. An elongated rail 54 projects along an entire longitudinal length of the second end 50b and is shaped and dimensioned to engage with and be received by a complementary slot 84 (FIG. 3A) in the swivel assembly 70 to removably attach the shooting rest assembly 10 (the swivel assembly thereof) to the tree stand 1 (FIG. 1A or 1B).

In the illustrated embodiment, the elongated rail 54 possesses a cross-section (taken perpendicular to the rear planar surface 50a of the second member 50) comprising a rectangular-shaped portion 54b spaced apart from the second end 50b via a pair of inclined wall segments 54a diverging in opposite directions and at an angle (e.g., 45° as shown) relative to the second end 50b. Yet, in other embodiments, it is contemplated that the elongated rail 54 may take on different shapes and forms or may only extend along a partial longitudinal length of the second end 50b. In other embodiments, it is also contemplated that the elongated rail may be formed on the swivel assembly 70, and that the second member 50 may instead define a complementary slot for receiving the rail. In this manner, it should be appreciated that the configuration (e.g., length, width, shape, etc.) of the bracket assembly may be different from that which is shown.

Still referring to FIG. 2A, a plurality of mounting holes 56 are formed in the second member 50 and extend between the first end 50a and the second end 50b thereof. In particular, the mounting holes 56 are positioned to align with the mounting holes 40 of the first member 30 and are dimensioned to receive fasteners (not shown) which are inserted through the mounting holes 40 of the first member 30 to removably attach (FIG. 2B) the first member 30 to the second member 50, and thus the bracket assembly 20 (and shooting rest assembly) to the rail 2 of the hunting stand 1.

With reference to FIG. 2A, an opening 51 may extend through one or both longitudinal ends 50c of the second member 50 for receiving a fastener 53a extending from a stop 53 that may be inserted into the respective longitudinal end 50c to engage with and prevent the swivel assembly 70 (FIG. 3A) from sliding off the rail 54 or fix a position of the swivel assembly 70 relative to the rail 54.

Figure 2C:
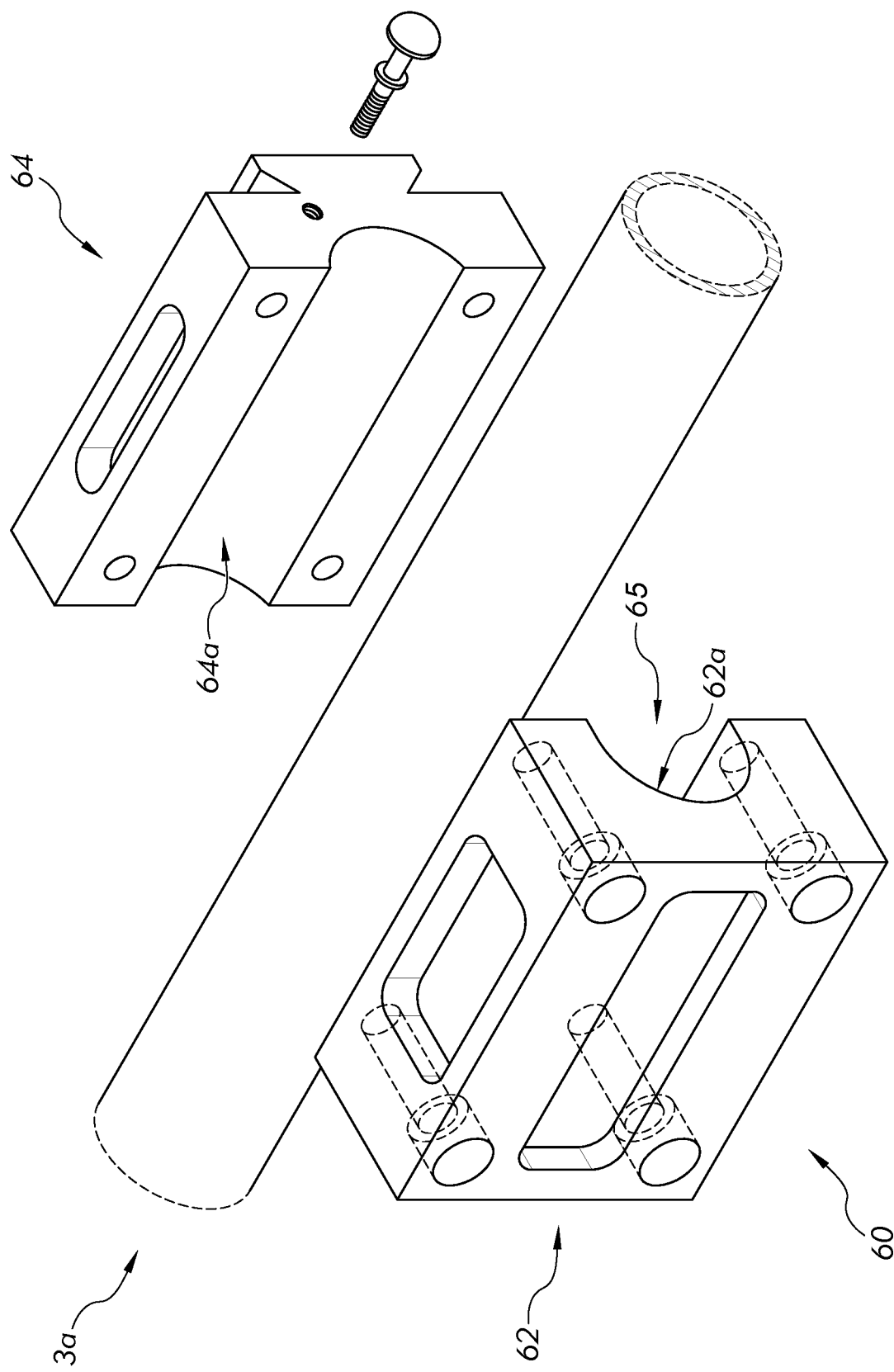
FIG. 2C is an enlarged, exploded rear perspective view of an example bracket assembly according to another embodiment shown in relation to an example roll bar.
Figure 2D:
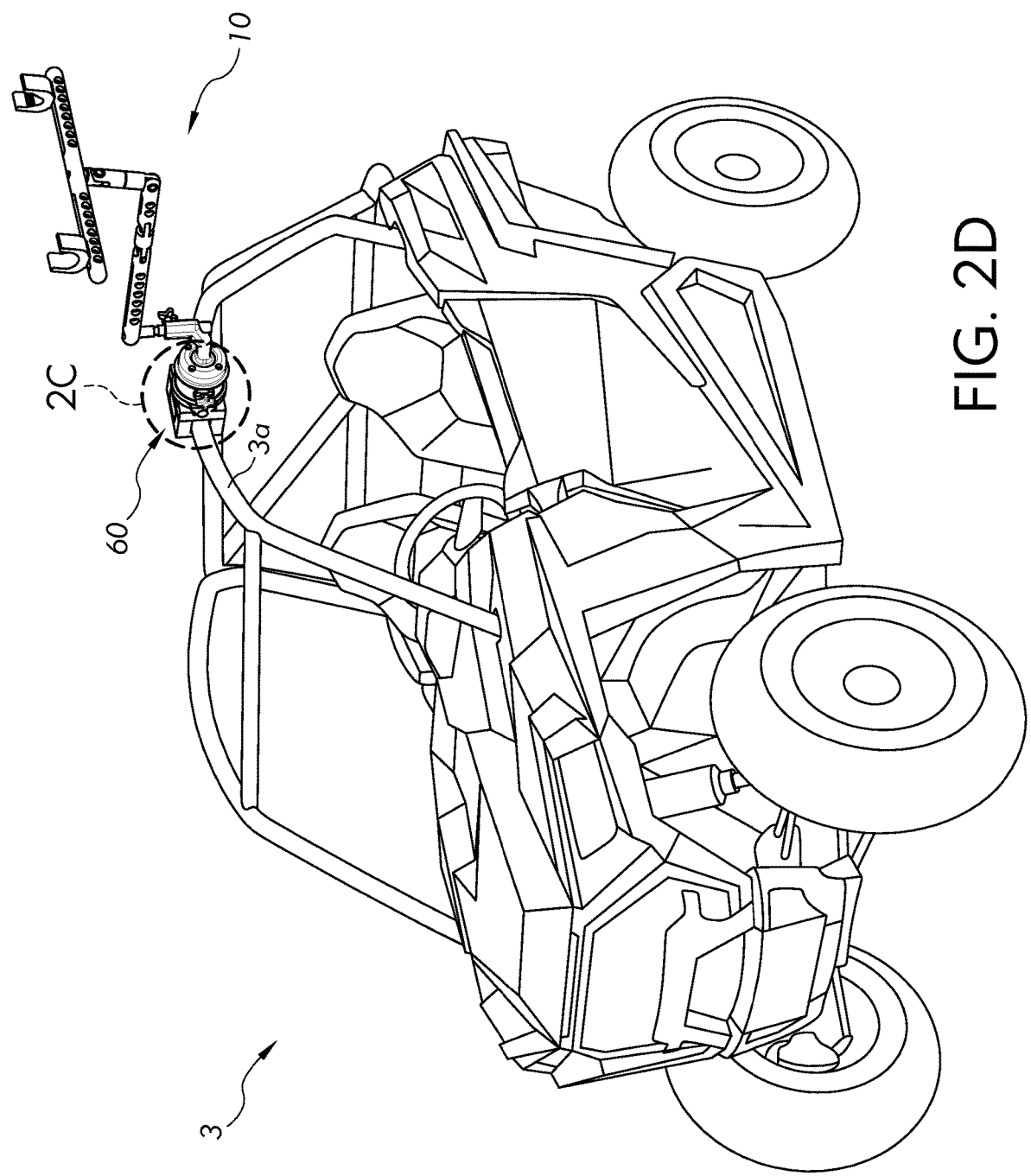
FIG. 2D is a perspective view of a shooting rest assembly according to another embodiment attached to an all-terrain vehicle (ATV) with the bracket assembly of FIG. 2C.

With reference to FIG. 2C, another example of a bracket assembly 60 is shown. In this embodiment, the bracket assembly 60 embodies a vehicular mount for attaching the shooting rest assembly to an ATV 3 (FIG. 2D). In distinction to the first embodiment, the first and second members 62 and 64 define concaved inner surfaces 62a and 64a extending longitudinally for defining a channel 65. In the illustrated embodiment, the channel 65 is dimensioned to receive and engage with a curved roll bar 3a, such as a circular tube, of the ATV 3 (FIG. 2D). Yet, it is contemplated that the first and second members 62 and 64 may be dimensioned and configured to receive and engage with other examples of support structure, for example, a post or a beam extending from a ground mount or from a building. It is also contemplated that the inner surfaces 62a and 64a may be shaped and dimensioned to receive and engage with support structure comprising other shapes, e.g., triangular or square-shaped structure, etc.

In some embodiments, it is contemplated that the concaved inner surfaces 62a and 64a may include gripping segments thereon to serve as an impediment surface for frictionally restraining the bracket assembly 60 (and thus the shooting rest assembly) from sliding relative to the structure that it is clamped or otherwise attached to. For example, a rubber inlay (not shown) or surface feature of the inner surfaces 62a and 64a (such as knurling) may be used for this purpose.

Figure 2E:
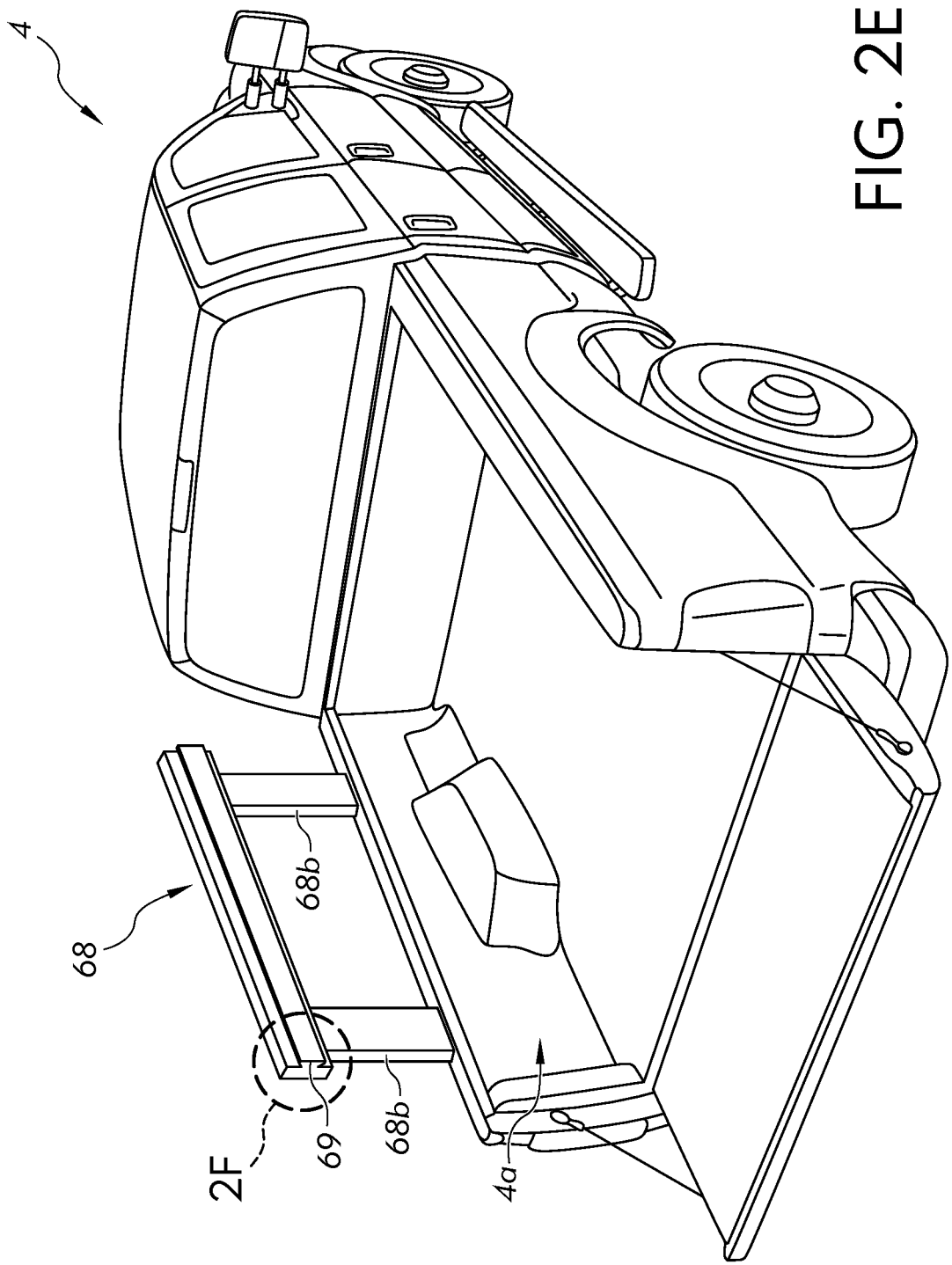
FIG. 2E is a rear perspective view of a pickup truck shown in relation to an example guide rail in an exploded view.

Referring to FIG. 2E, it is also contemplated that the shooting rest assembly may be attached to another vehicle, for example, to a bed 4a of a pickup truck 4. In such embodiments, it is contemplated that the shooting rest assembly may comprise a vehicular mount in the form of an elongated member 68 that is removably attached to a corresponding side of the bed 4a via support posts 68b that may be attached to the bed of the truck, for example, by clamping the posts 68b to one of the existing side rails (not shown) of the truck.

Figure 2F:
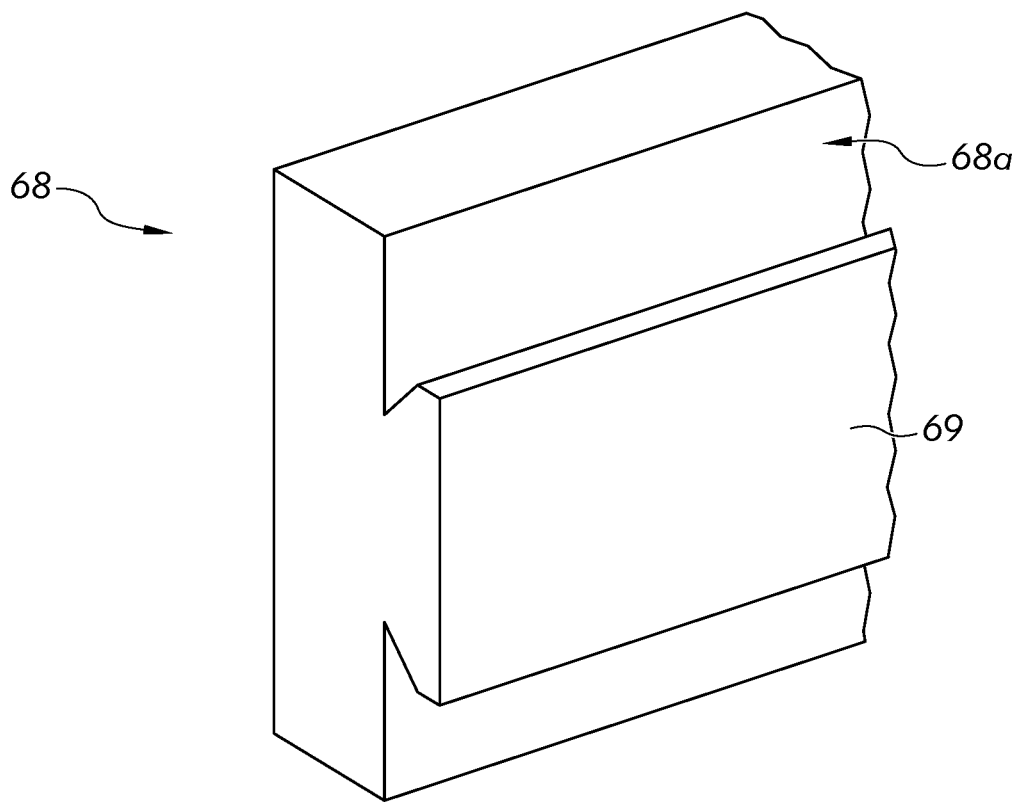
FIG. 2F is a partial, closeup view of the area bounded by dash lines in FIG. 2E.
Figure 2G:
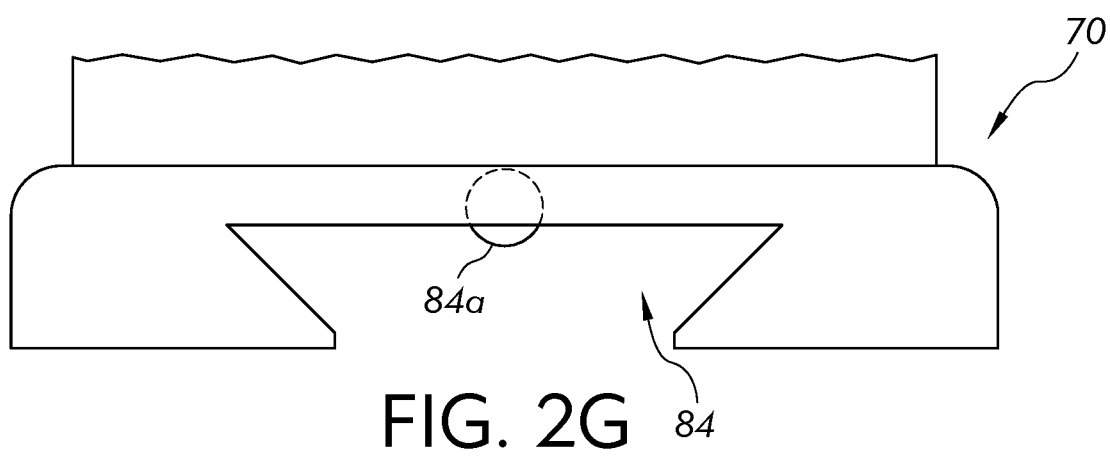
FIG. 2G is a partial, closeup view of an example swivel assembly housing according to an embodiment.

As shown in FIG. 2F, an elongated rail 69 is formed on an inner surface 68a of the elongated member 68 and is dimensioned to slidably engage with a slot (see, e.g., 84 in FIG. 2G or FIG. 3A) of the swivel assembly 70 for attaching the shooting rest assembly to the rail 69. In some embodiments, it is contemplated that either the rail 69 or the slot 84 (FIG. 3A) may possess features (e.g., ball bearings or a gauge ball; see, e.g., 84a in FIG. 2G) for creating a reduced friction interface that allows the shooting rest assembly to be quickly slid or otherwise moved along the rail 69.

Referring now to FIG. 3A, the swivel assembly 70, in general, includes a housing 80, a resistance control mechanism 108, a plunger or piston 130, a pivotable support body 150, and a flange 170.

In the illustrated embodiment, the housing 80 includes a rear surface or first end 80a and a front surface or second end 80b spaced apart and connected by a circumferential side wall 80c. Like the bracket assembly, the housing 80 is made of rigid material of suitable strength and preferably a corrosion-resistant metal such as Aluminum 6061-T6 material. In the illustrated embodiment, the housing 80 depicts a cylindrical-shaped body wherein the side wall 80c thereof is recessed inwardly relative to the first and second ends 80a and 80b. It is contemplated that the housing may take on different shapes (e.g., a square-shaped body) without departing from the scope of the present disclosure.

The first end 80a may define an elongated slot 84 extending between opposing sides of a circumference of the first end 80a and perpendicular to a longitudinal axis LA of the housing 80. As noted above, the slot 84 is configured to slidably receive the rail (see, e.g., 54 and 69 in FIGS. 2A and 2E, respectively) of the bracket assembly 20 for removably attaching the shooting rest assembly to support structure, e.g., to a tree stand (FIG. 1), an ATV roll bar (FIG. 2D), a rail fixed to a truck bed (FIG. 2E), or any other example of support structure described herein.

In the illustrated example, the slot 84 may possess a cross section (taken parallel to the longitudinal axis LA of the housing) defined by a pair of inclined wall segments 84a converging towards the first end 80a. Specifically, the inclined wall segments 84a are configured to dimensionally correspond and slidably engage with the inclined wall segments 54a (FIG. 2A) of the rail 54 of the bracket assembly 20, respectively, to removably secure the swivel assembly 70 thereto. As noted above, the bracket assembly 20 may include a stop (e.g., 53 in FIG. 2A) that is dimensioned to engage the housing 80 (e.g., the first end 80a thereof) to prevent the swivel assembly 70 from sliding off the rail 54 (FIG. 2A) or for fixing a position of the swivel assembly 70 relative to the rail 54 (FIG. 2A). When assembled to the bracket assembly 20, the first end 80a (rear surface thereof) will abut against the front surface 50b (FIG. 2A) of the second member 50.

Figure 3B:
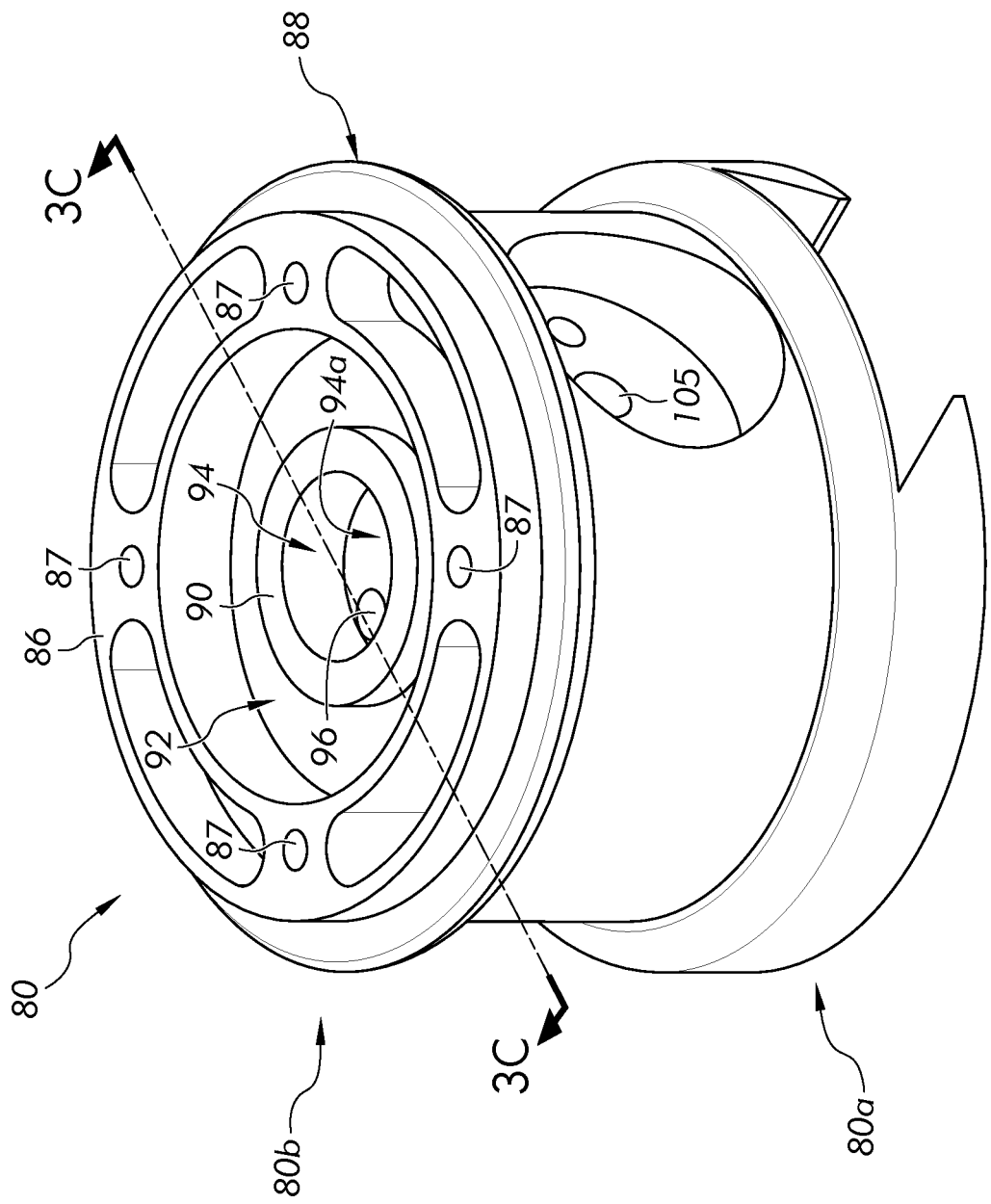
FIG. 3B is an enlarged, perspective view of an example housing of the swivel assembly of FIG. 3A.
Figure 3C:
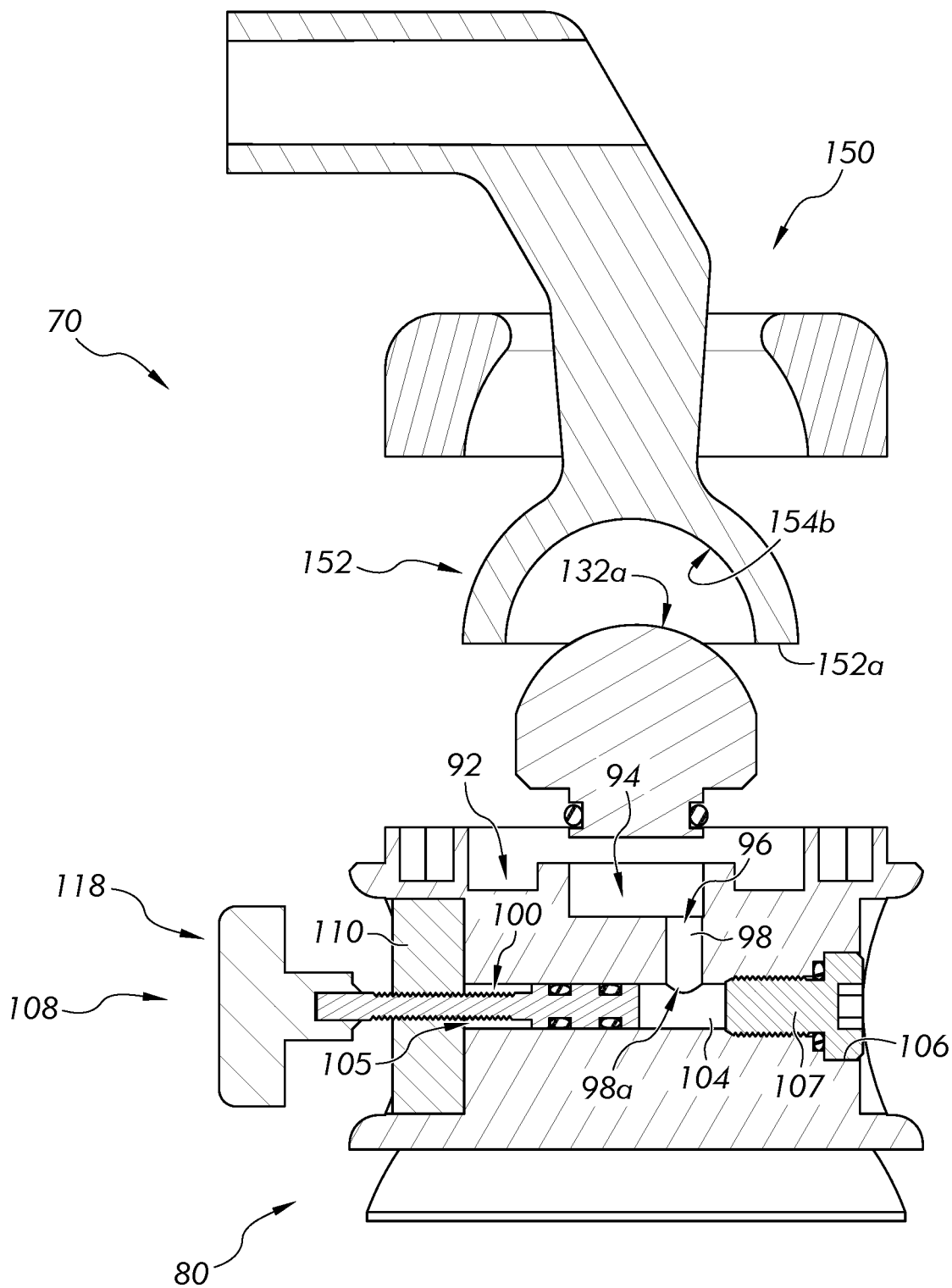
FIG. 3C is an enlarged, sectioned and exploded view of the swivel assembly of FIG. 3A taken along line 3C-3C of FIG. 3B.

Turning now to FIGS. 3B and 3C, an enlarged perspective view of the housing 80 and a section view of the swivel assembly 70 (taken along line 3C-3C of FIG. 3B) are shown, respectively. In the illustrated embodiment, the second end 80b of the housing 80 includes a raised annular portion 86 extending about and adjacent to a periphery 88 of the second end 80b. The second end 80b also includes an annular wall 90 spaced inwardly and concentric relative to the raised annular portion 86. Collectively, the raised annular portion 86 and the annular wall 90 define a recessed area 92 (i.e., an annular recess) dimensioned to receive a distal end 152a (FIG. 3C) of a cup 152 (FIG. 3C) extending from the pivotable support body 150. Specifically, the recessed area 92 is configured to accommodate the distal end 152a of the cup 152 when the cup 152 (and thus the pivotable support body 150) is secured to the housing 80 via the flange 170 (FIG. 3A), as discussed in detail below. As shown in FIG. 3B, a plurality of openings 87 are formed in the raised annular portion 86 and are dimensioned and positioned to align with openings 172 (FIG. 3A) in the flange 170. Separately, the annular wall 90 delimits a depressed seat 94 that is dimensioned and positioned to accommodate a stem 134 (FIG. 3A) extending from a body 132 of the piston 130 (FIG. 3A). In other embodiments, it is contemplated that the second end 80b may be defined by a planar surface, and that the recessed area and/or the seat may extend below the planar surface. In the illustrated embodiment, an opening 96 (FIG. 3B) is formed in the seat 94 and serves as a hydraulic fluid outlet of the housing 80, as discussed in detail below.

Turning now to FIG. 3C, the housing 80 defines a first channel 98, a second channel 100, and a third channel 104 therein for accommodating a fluid (not shown), e.g., a hydraulic fluid or other comparable medium, e.g., an oil, a combination of oil and water, etc. Collectively, the channels 98, 100, and 104 define an internal cavity for containing or accommodating the fluid.

The first channel 98 opens to the seat 94 via the opening 96 therein and is fluidly connected to the second and third channels 100 and 104 at an inlet 98a thereof. In the illustrated example, the second and third channels 100 and 104 each extend in opposite directions from the inlet 98a of the first channel 98 towards opposite sides of the housing 80. It is contemplated that the location, orientation, and size of the channels (and/or the internal cavity defined therefrom) may differ from that which is shown without departing from the scope of the present disclosure.

Specifically, the second channel 100 extends through the housing 80 and opens to the side wall 80c via an opening 105 (i.e., first side opening) therein. Conversely, the third channel 104 extends through the housing 80 and opens to the side wall 80c via another opening 106 (i.e., second side opening) therein, for example, at an opposite side of the housing.

With reference to FIGS. 3A and 3C, the side wall 80c defines a depression 102 that is shaped and dimensioned to receive a body 110 of the resistance control mechanism 108, as discussed in detail below. As noted above, an opening 105 (i.e., the first side opening) extends into the side wall 80c and is dimensioned to receive a shank or rod 116 (FIG. 3A) of the resistance control mechanism 108 therethrough. Additionally, a pair of oppositely disposed blind holes 103 (FIG. 3A) are formed around the opening 105 and are dimensioned to receive fasteners (not shown) extended through other, corresponding openings 112 of the body 110 of the resistance control mechanism 108, respectively. The blind holes 103 may be partially or entirely threaded to engage with fasteners (not shown) for removably securing the resistance control mechanism 108 to the housing 80.

With reference to FIG. 3C, the other opening 106 (i.e., the second side opening) is threaded to receive a fastener 107 therethrough. In use, the fastener 107 may be selectively removed (e.g., by the user, the manufacturer, a service dealer) when it is necessary to fill the internal cavity (i.e., defined by channels 98, 100, and 104) of the housing 80 with fluid. Moreover, this opening 106 may be machined as a counterbore to accommodate the head of the fastener 107 to make the housing 80 aesthetically more pleasing in fit and finish.

With reference to FIGS. 3A and 3C, the swivel assembly 70 may also include a resistance control mechanism 108. The resistance control mechanism 108 is a particular feature of the present disclosure that is operable to adjust or modulate the frictional resistance (i.e., degree of frictional engagement) between a concaved inner surface 154b of the cup 152 and a spherical-shaped portion 132a (outer surface thereof) of the piston 130. In particular, the resistance control mechanism 108 may include a cylindrical-shaped body 110 (FIG. 3A) that is dimensioned to be received by the depression 102 (FIG. 3A) in the side wall 80c of the housing 80.

Referring to FIG. 3A, a pair of openings 112 may extend through the body 110 of the resistance control mechanism 108. These openings 112 may be dimensioned and positioned to align with the blind holes 103 extending into the side wall 80c of the housing 80 adjacent to the depression 102, respectively, to receive fasteners (not shown) for securing the resistance control mechanism 108 to the housing 80. The body 110 may also define another opening 114 corresponding to the first side opening 105 of the housing 80. Specifically, this opening 114 (FIG. 3D) may be threaded to receive and engage with a threaded portion 116e (FIG. 3D) of the rod 116 of the resistance control mechanism 108 such that the rod 116 may be rotated relative to the body 110 to respectively extend or retract the rod 116 into or out of the second channel 100 (FIG. 3C) of the housing 80. In addition, the resistance control mechanism 108 may include a control knob 118 disposed at a proximal end 116a of the rod 116. In this manner, the rod 116 may be extended or retracted out of or into the second channel 100 (FIG. 3C) by rotating the knob 118 without the need for any tools. An enlarged, distal portion 116b of the rod 116 (i.e., a head of the rod) may define a plurality of circumferential grooves 116c therein, respectively, for accommodating o-rings or other sealing structure to prevent fluid in the housing 80 from leaking through the first side opening 105, e.g., past the distal portion 116b of the rod 116. In the embodiment shown, the distal portion 116b of the rod 116 is dimensioned to correspond to an internal diameter of the second channel 100 (FIG. 3C) to promote a fluid tight seal between the distal portion 116b and the second channel 100 (FIG. 3C).

With reference to FIG. 3A, the piston 130 may comprise a body 132 defining a spherical-shaped portion 132a and a stem 134 extending from the body 132 at an opposite side of the spherical-shaped portion 132a. The spherical-shaped portion 132a is formed (and preferably machined) to maintain a dimensional tolerance such that the radius thereof corresponds with the radius defined by the concaved inner surface 154b of the cup 152. For the purposes of this disclosure, the spherical-shaped portion 132a should be understood as encompassing a wide variety of rounded portions, for example, a portion defined by a partial sphere (e.g., less than half of a sphere, more than half of a sphere, etc.). In this manner, the spherical-shaped portion 132 should not be understood as being limited to an entire sphere.

Figure 3D:
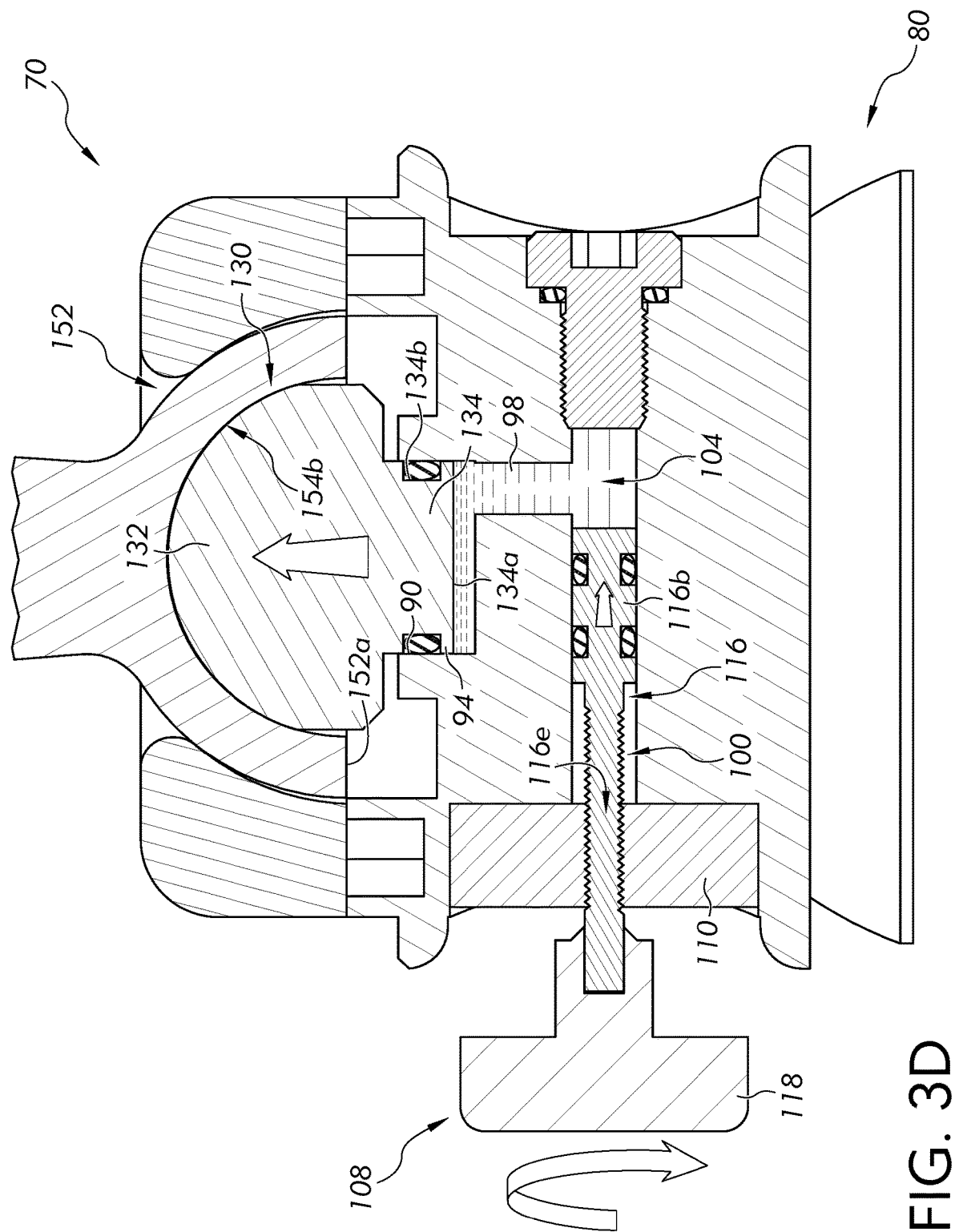
FIG. 3D is a partial, closeup section view of the swivel assembly taken along line 3C-3C of FIG. 3B.

Meanwhile, the stem 134 may include a distal end 134a (defined by a planar surface) that is dimensioned to engage a planar surface 94a (FIG. 3B) of the seat 94 of the housing 80. With reference to FIG. 3D, the stem 134 is formed (and preferably machined) to maintain a dimensional tolerance such that the diameter thereof corresponds to an interior diameter of the seat 94. The stem 134 may also define a circumferential groove 134b configured to accommodate an o-ring or other sealing structure therein to prevent fluid from leaking between and/or past the junction of the stem 134 and the annular wall 90 of the housing 80.

Still referring to FIG. 3A, the pivotable support body 150 comprises a spherical-shaped cup 152 and a support arm or holder 156 extending therefrom. Preferably, the holder 156 and the cup 152 are integrally formed, and preferably manufactured as a casting. Although, it is contemplated that the holder 156 may be separately formed and attached to the cup 152 with removable fasteners. The cup 152 comprises a spherical wall 154 with an outer surface 154a and a concaved inner surface 154b. The concaved inner surface 154b is dimensioned to correspond with the dimensions of the spherical-shaped portion 132a of the piston 130, i.e., an outer surface thereof. As noted above, a distal end 152a of the cup 152 is shaped and dimensioned to be received by the annular recess 92 (FIG. 3B) at the second end 80b (FIG. 3B) of the housing 80 and retained in place when the flange 170 is removably attached to the housing 80.

In the illustrated embodiment, the holder 156 comprises a first segment 156a, a second segment 156b substantially perpendicular to the first segment, and a third segment 156c therebetween that is inclined relative to the first and second segments 156a and 156b, respectively, giving the holder 156 a substantially L-shaped appearance. Yet, it is contemplated that the holder 156 may have different shapes and forms, for example, two segments perpendicular to each other or a single continuous curved segment, etc. In the embodiment shown, an opening 158 (depicted as a through bore) extends through the entire longitudinal length of the second segment 156b and through a portion of the third segment 156c. The opening 158 is dimensioned and positioned to receive a mounting rod 210 (FIG. 4A) of the articulating arm assembly 200, as discussed in detail below.

With reference to FIG. 3A, the flange 170 is generally a ring-shaped element comprising a first end 170*a* and a second end 170*b*. In use, the flange 170 is removably attached to the housing 80 and is configured to secure the pivotable support body 150 and the piston 130 to the housing 80.

A central opening 171 extends through the flange 170 between the first end 170*a* and the second end 170*b* and is dimensioned to receive the holder 156 of the pivotable support body 150 therethrough. In the embodiment shown, the opening 171 is defined by a rounded inner surface 170*c* of the flange 170 and is dimensioned to correspond with an outer surface 154*a* of the cup 152. In this manner, the flange 170 is configured to mesh with the cup 152 when it is removably attached to the housing 80. A plurality of openings 172 (e.g., counterbores as shown) extend between the first end 170*a* and the second end 170*b* of the flange 170 and are positioned to align with the other corresponding openings 87 (FIG. 3B) of the housing 80. Specifically, these openings 172 are dimensioned to receive fasteners (not shown) therethrough that are extended into the corresponding openings 87 (FIG. 3B) of the housing 80 to removably attach the flange 170 to the housing 80.

An example operation of the resistance control mechanism will now be described referring to FIGS. 3A-3E. As noted above, the resistance control mechanism 108 is operable to variably modulate the friction (i.e., frictional resistance or frictional engagement) resisting the relative motion of the cup 152 (and thus the yoke assembly and weapon thereon) relative to the piston 130. More specifically, the resistance control mechanism 108 is operable to variably modulate the amount of engagement and resulting friction between the concaved inner surface 154*b* of the cup and the spherical-shaped portion 132*a* (outer surface thereof) of the piston 130. In other words, the resistance control mechanism 108 is a particular feature of the present disclosure that modulates how freely the cup 152 moves relative to the piston 130.

Figure 4A:
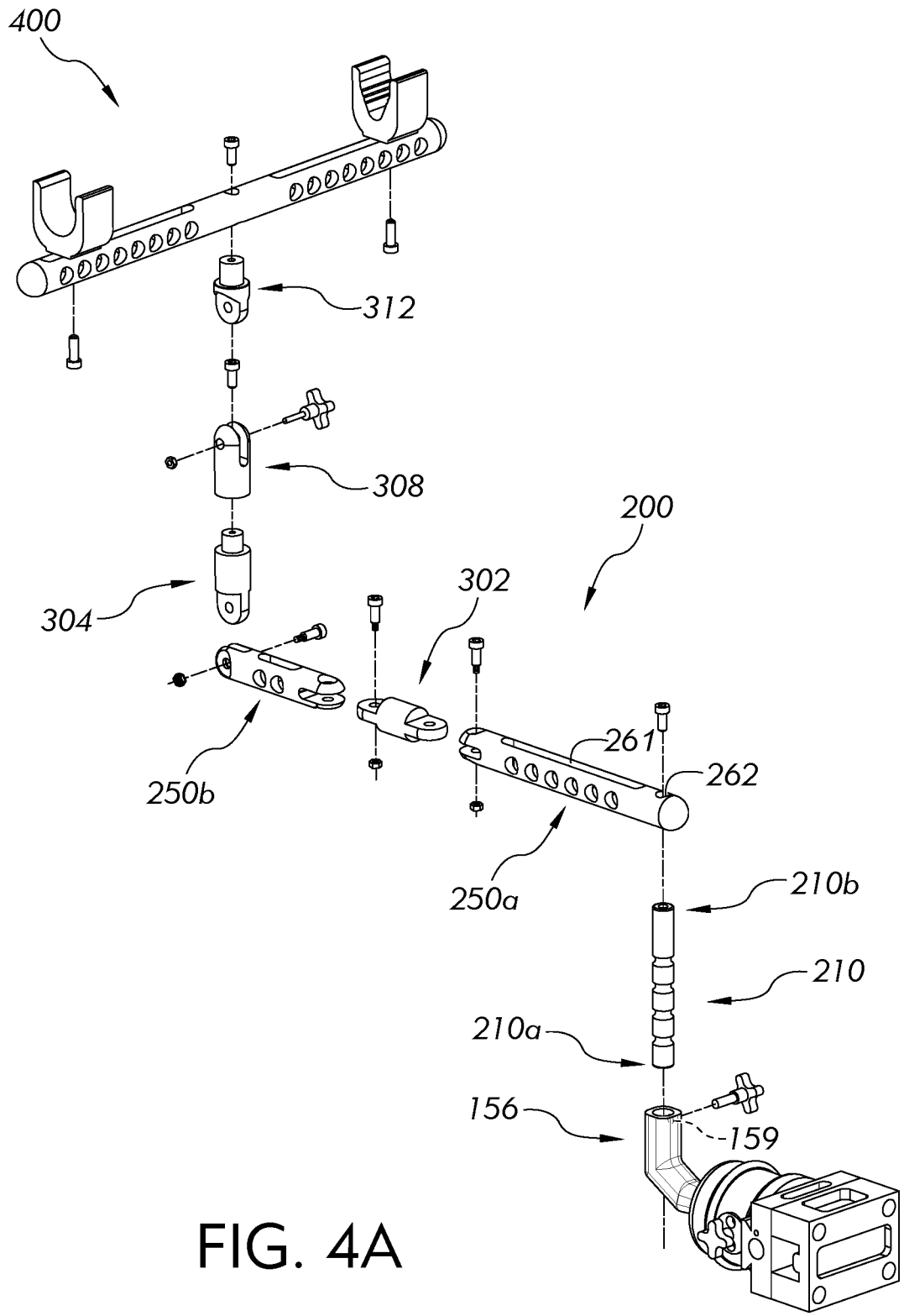
FIG. 4A is a perspective view of an example articulating arm assembly and example yoke assembly.

In particular, the resistance control mechanism 108 is operable in a low resistance setting (wherein the cup 152 is freely rotatable relative to the piston) and in a high resistance setting (wherein the piston 130 is biased against the concaved inner surface 154*b* of the cup 152 such that the cup 152 cannot be moved relative to the piston 130). Distinctively, however, the resistance control mechanism 108 is also operable in one or more intermediate settings that gradually increase the frictional engagement between the piston 130 and the cup 152, producing static frictional forces that will cause the cup 152 (and thus the yoke assembly with the weapon thereon) to remain in place (at rest) until such forces are overcome by the user, e.g., by applying a force to move the weapon, which indirectly transmits a force to move the cup 152. Specifically, moving the weapon (e.g., FIGS. 5A and 5B) will transmit a force to move the cup 152 about the piston 130 via the yoke assembly 400 (FIG. 4A) and the articulating arm assembly 200 (FIG. 4A). In particular, moving the weapon from one position (FIG. 5A) to another (FIG. 5B), will cause the yoke assembly 400 and the articulating arm assembly 200 to pivot about the piston 130 via the engagement between the mounting rod 210 (FIG. 4A) and the holder 156 (FIG. 4A) that receives the mounting rod 210, for example, in such embodiments wherein the position of the arms and links of the articulating arm assembly 200 (FIG. 4A) are fixed in place.

This aspect of the present disclosure is particularly beneficial since the static frictional forces established by the one or more intermediate settings will support the weight of the weapon (such that it will not move at rest), while still permitting the user to gradually and steadily reposition the weapon by applying force to move the weapon about the piston 130, for example, when it is desired to move the weapon when tracking a moving animal. Indeed, this particular feature of the present disclosure distinguishes conventional pivot joints, which require the user to manually unclamp or unlock the pivot (such that it is freely rotatable) before moving the weapon, which is not only undesirable and time consuming, but may cause the hunter to lose sight of the moving animal. Moreover, unlocking the pivot such that it is freely rotatably (e.g., such that the weapon will move via gravity) may cause the weapon to be suddenly and inadvertently jerked, causing the hunter to lose sight of the moving animal. In contrast, by establishing one or more intermediate settings of gradually increasing friction that the user may overcome (e.g., by moving the weapon), the intermediate settings will preclude such quick, inadvertent movements, resulting in a more steady and gradual movement of the weapon from one position (FIG. 5A) to another (FIG. 5B).

Figure 3E:
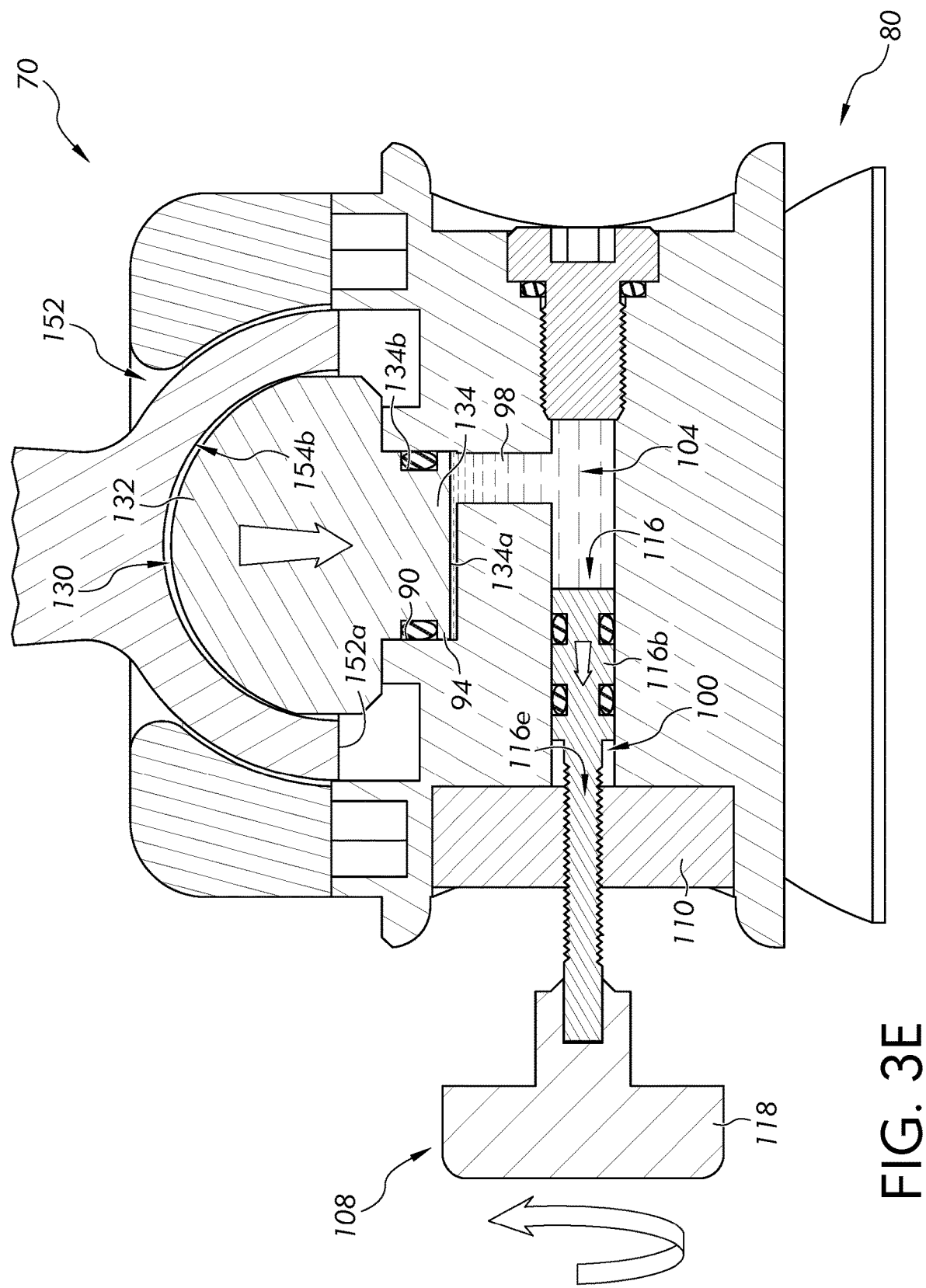
FIG. 3E is another partial, closeup section view of the swivel assembly taken along line 3C-3C of FIG. 3B.

Specifically, as shown, in FIGS. 3D and 3E, the resistance settings may be changed by rotating the resistance control knob 118 clockwise (FIG. 3D) to increase friction or counterclockwise (FIG. 3E) to decrease friction. Referring to FIG. 3D, rotating the control knob 118 clockwise will gradually cause the rod 116 of the resistance control mechanism 108 to extend into the second channel 100, thereby exerting pressure on the fluid (e.g., hydraulic fluid) in the internal cavity defined by the first through third fluid channels 98, 100, and 104 respectively. In particular, this increase in pressure will compress and direct the fluid through the first channel 98, thereby exerting pressure against a planar surface 134*a* of the stem 134. Specifically, this increase in pressure will gradually move the piston 130 away from the seat 94, thereby biasing the piston 130 into frictional engagement with the concaved inner surface 154*b* of the cup 152. Rotating the knob 118 until it cannot be rotated any further, for example, when the increased fluid pressure precludes such further movement, will coincide with a high resistance setting, thereby locking or clamping the cup 152 (FIG. 3A) relative to the piston 130 (FIG. 3A).

Conversely, referring to FIG. 3E, rotating the resistance control knob 118 (counterclockwise in the embodiment shown) will cause the rod 116 of the resistance control mechanism 108 to retract out of the second channel 100, thereby decreasing the fluid pressure exerted against the planar surface 134*a* of the stem 134. Specifically, this will cause the piston 130 to gradually move back toward the seat, thereby decreasing the frictional engagement between the cup 152 and the piston 130. At a certain point of rotation, the piston will fully disengage the cup, coinciding with a low resistance setting, whereupon the cup 152 may freely rotate or pivot relative to the piston 130.

As noted above, however, resistance control mechanism 108 is also operable to adjust the frictional engagement between the cup 152 and the piston 130 in one or more intermediate settings. Specifically, gradually rotating the knob 118 clockwise (to one or more positions between the low resistance setting and the high resistance setting) will cause the fluid to exert an intermediate amount of pressure against the piston, correspondingly increasing the frictional engagement between the cup 152 and the piston 130. These settings are particularly advantageous, since it allows the user to modulate how freely the cup 152 rotates relative to the piston 130. Moreover, the intermediate settings may be predefined to resist the force of gravity (attributed to the weight of the weapon) at rest, while permitting the user to reposition the weapon by applying force thereto to gradually move the weapon, for example, when tracking a moving animal, such as wild deer or other wild game. In such embodiments, it is contemplated that the settings may be predefined to resist the forces of gravity associated with an assortment of weapons (e.g., weights thereof) or a maximum weight limit. It is also contemplated that the amount of hydraulic fluid within the cavity may be predefined to accomplish this purpose.

Figure 5A:
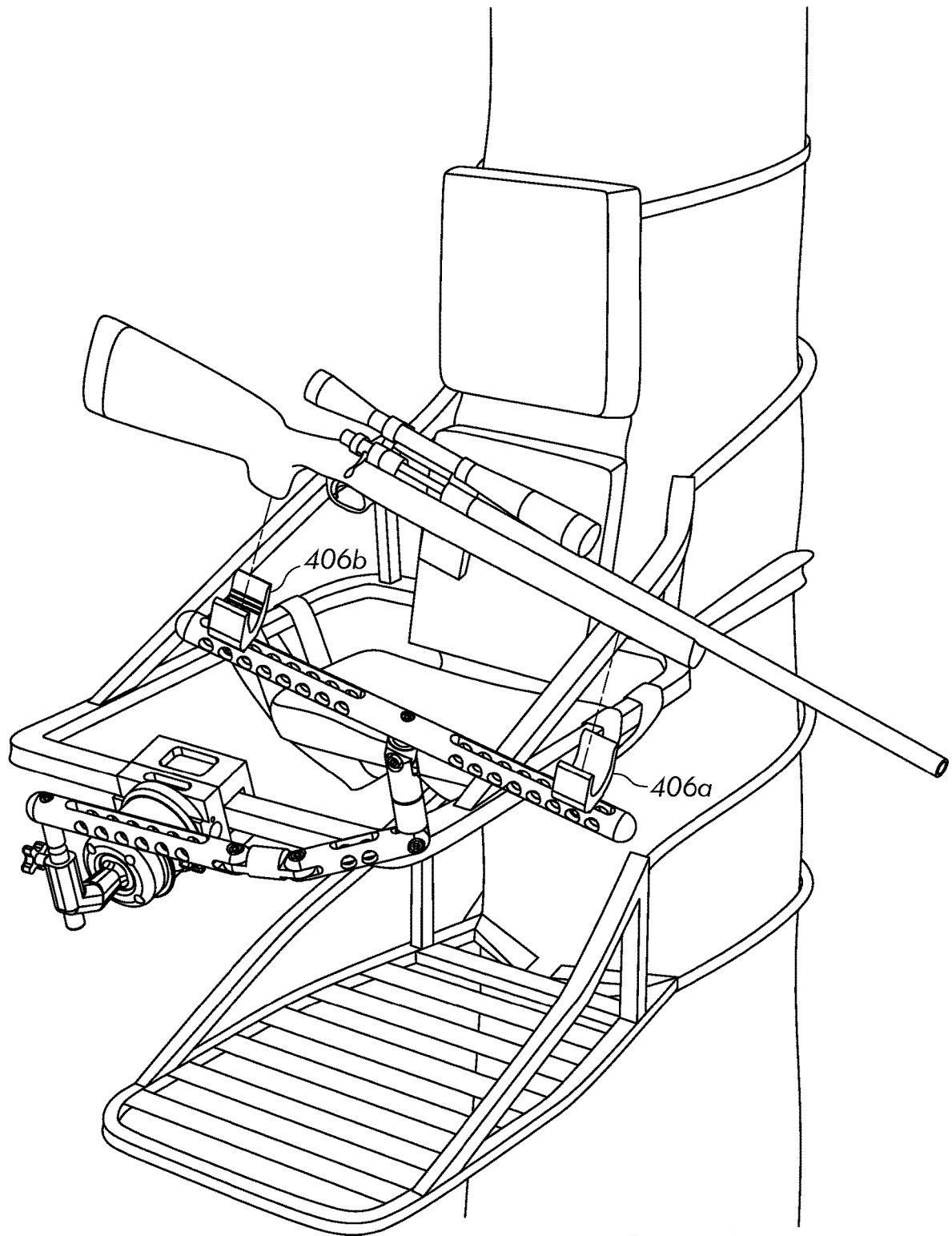
FIG. 5A is a front perspective view of the shooting rest assembly of FIG. 1 shown supporting a rifle in a first position.
Figure 5B:
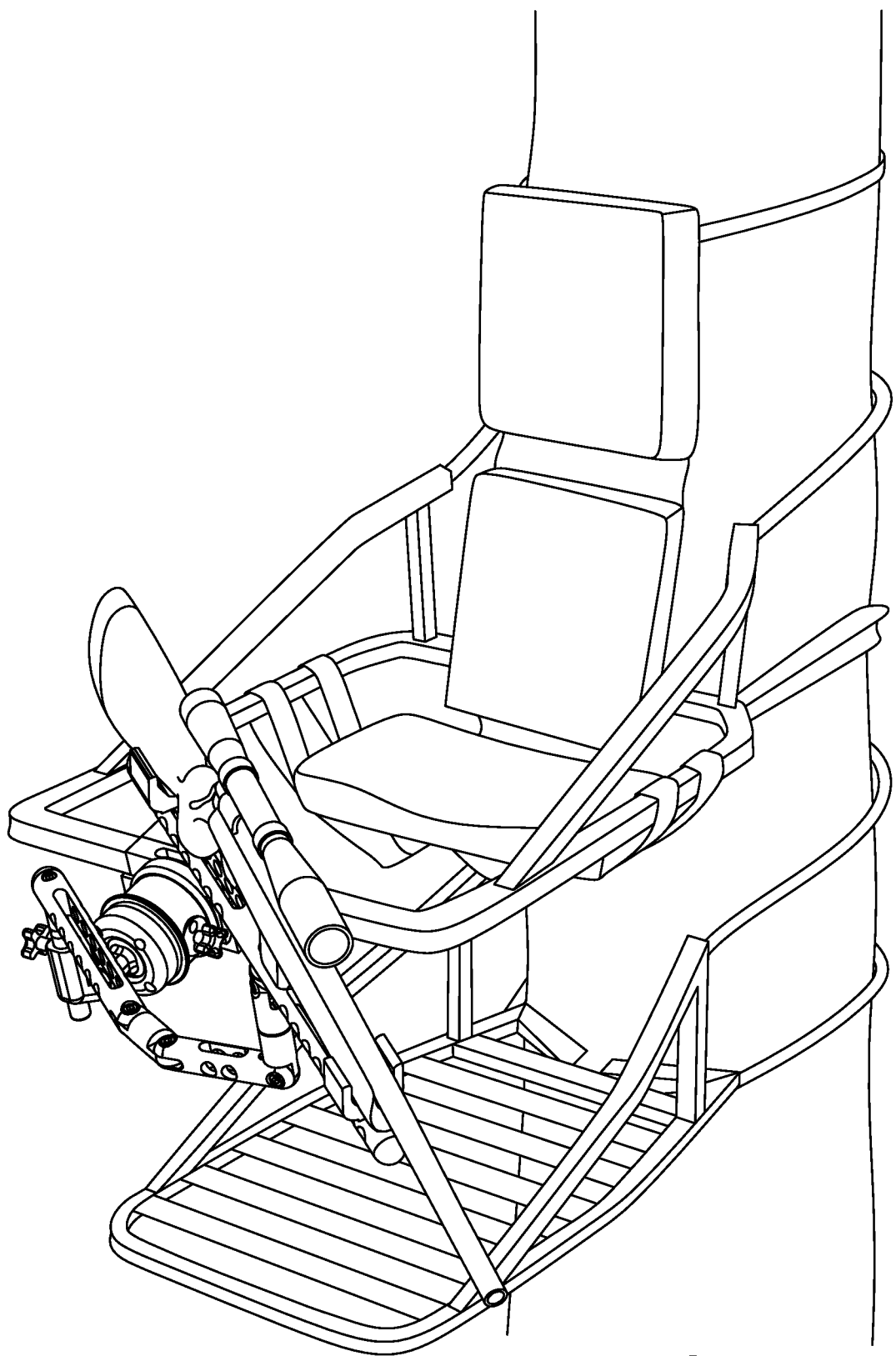
FIG. 5B is another front perspective of the shooting rest assembly of FIG. 1 shown supporting a rifle in a second position.

Referring to FIGS. 5A and 5B, the intermediate settings allow the user to gradually and effortlessly move the weapon while focusing on the moving target, for example, from one position (FIG. 5A) to another (FIG. 5B). This is in distinction to pivot joints requiring the user to manually unclamp or unlock the pivot to move the weapon, which may cause the hunter to lose sight of the moving target.

In some embodiments, the housing 80 may include indicia, numbers, or a graphic thereon depicting the intermediate settings (the intensity or resistance level thereof) to assist the user to identify with a desired intermediate setting.

Turning now to FIG. 4A, an example of the articulating arm assembly 200 and yoke assembly 400 will now be described. The articulating arm assembly 200, in general, includes a mounting rod 210, one or more arms (e.g., first and second arms 250a and 250b) and links (e.g., a horizontal link 302, two vertical links 304 and 308, and a swivel link 312). Distinctively, the articulating arm assembly 200 may also define a plurality of pivot joints or axes for increasing the range of movement of the shooting rest assembly 10, as discussed in detail below.

Figure 4B:
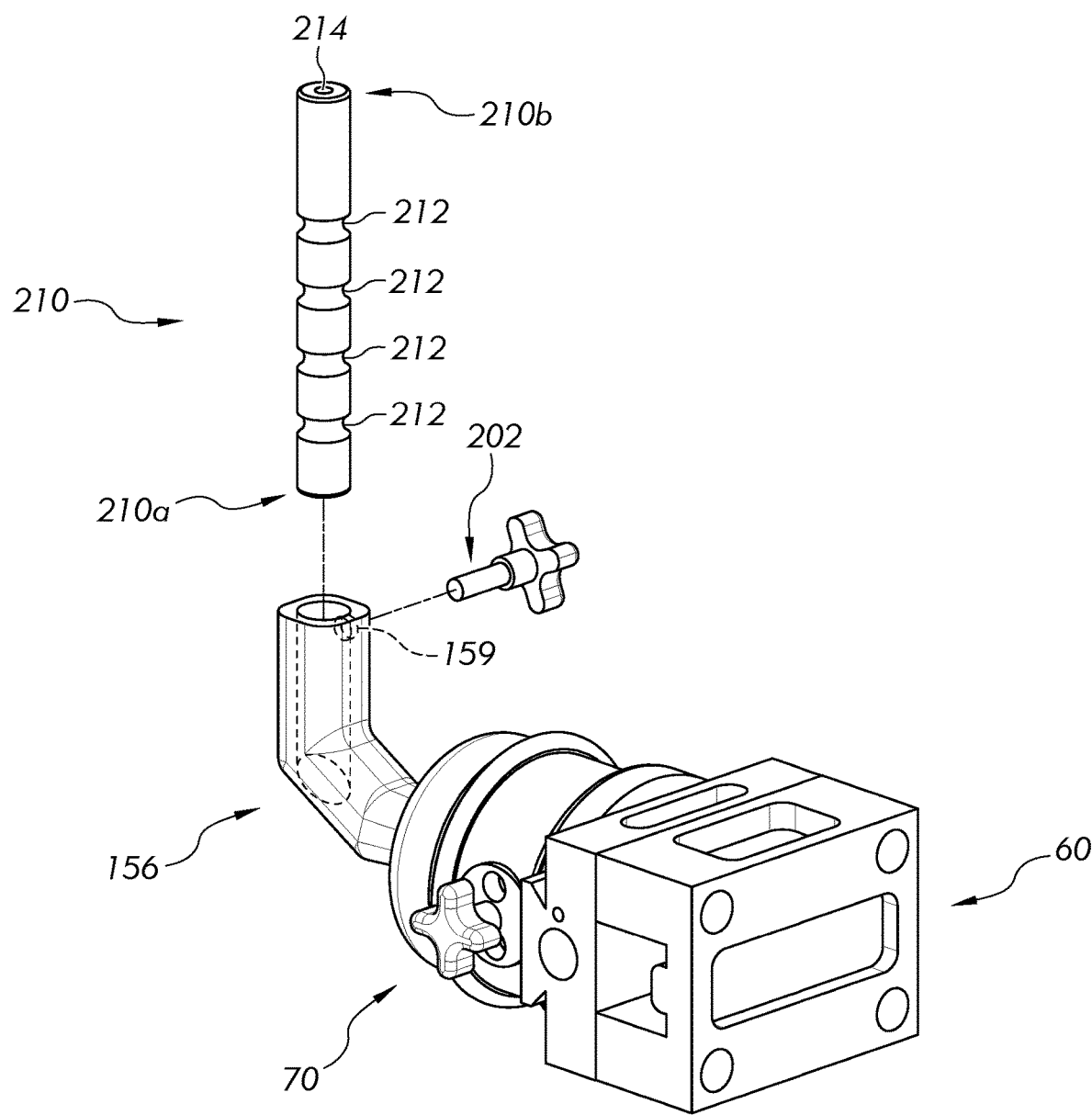
FIG. 4B is an enlarged, perspective view of an example mounting rod shown in relation to the bracket assembly and swivel assembly of FIGS. 2A and 3A.

Referring to FIG. 4B, the mounting rod 210 is depicted as a cylindrical element including a first end 210a and a second end 210b. A plurality of spaced, circumferential grooves 212 extend radially into a circumference of the rod 210 and define detents corresponding to height adjustment positions. Specifically, the height of the yoke assembly 400 (FIG. 4A) may be adjusted by extending a removable fastener 202 through an opening 159 of the holder 156 and into engagement with a respective groove 212 corresponding to the desired height position. The fastener 202 may embody a wing-bolt (as shown) or other examples of fasteners, e.g., a spring-loaded detent pin, a set screw rotatable via an Allen key, self-locking fasteners, removable pins, clips, etc. Preferably, any such example of a fastener described herein will be made from a corrosion resistant material, for example, 303 stainless steel.

Referring to FIGS. 4B and 4C, the second end 210b of the mounting rod 210 is dimensioned such that it may be inserted into an opening 262 (FIG. 4C) of the first arm 250a to secure the mounting rod 210 thereto. Specifically, the second end 210b (FIG. 4B) may define an axial opening 214 for receiving a fastener 264 (FIG. 4C) extended through the opening 262 (FIG. 4C) of the first arm 250a to secure a proximal end 260 (FIG. 4C) of the first arm 250a to the mounting rod 210 (FIG. 4B). In some embodiments, the second end 210b (FIG. 4B) of the mounting rod 210 and the opening 262 (FIG. 4C) of the first arm 250a may also define a first pivot axis PA1 (FIG. 4G) of the articulating arm assembly 200 such that first arm 250a (and thus the entire articulating arm assembly) may be rotated (e.g., in a horizontal plane and about the mounting rod 210, as shown) to adjust the orientation thereof. However, it should also be understood that the desired orientation of the first arm 250a may be fixed (e.g., locked in place), for example by securing (tightening) the fastener 264.

Referring to FIGS. 4A and 4C, the first arm 250a and the second arm 250b may be pivotally connected via a horizontal link 302. Although, in other embodiments, it is contemplated that the first arm 250a and the second arm 250b may embody a single arm attached to the mounting rod 210, e.g., instead of two separate arms 250a and 250b.

As shown in FIG. 4C, the first arm 250a is depicted as an elongated, cylindrical element with a proximal, rounded end 260 and a distal, bifurcated end 270. As noted above, the proximal end 260 may define an opening 262 for receiving a fastener 264 therethrough that is extended into the corresponding opening 214 (FIG. 4B) of the mounting rod 210 to removably secure the first arm 250a thereto.

Figure 4D:
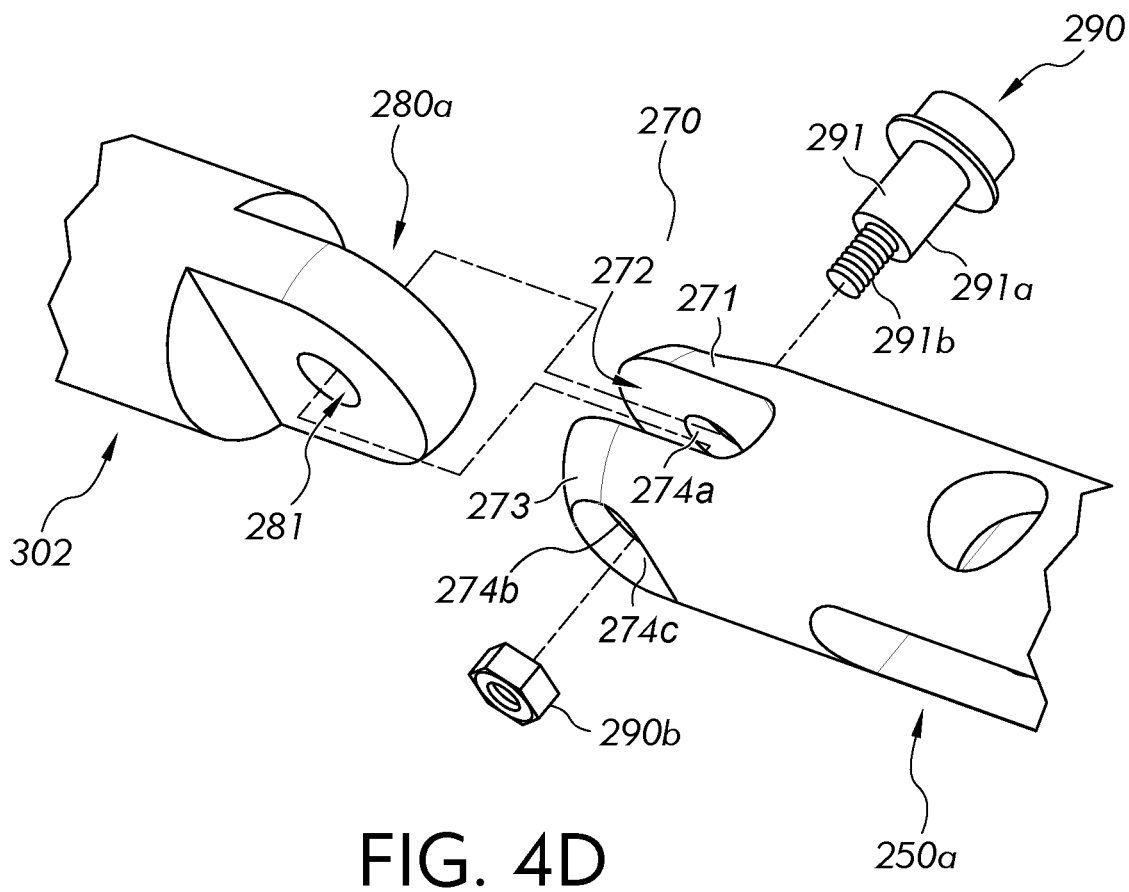
FIG. 4D is a closeup, exploded view of the area bounded by dashed lines in FIG. 4C.
Figure 4E:
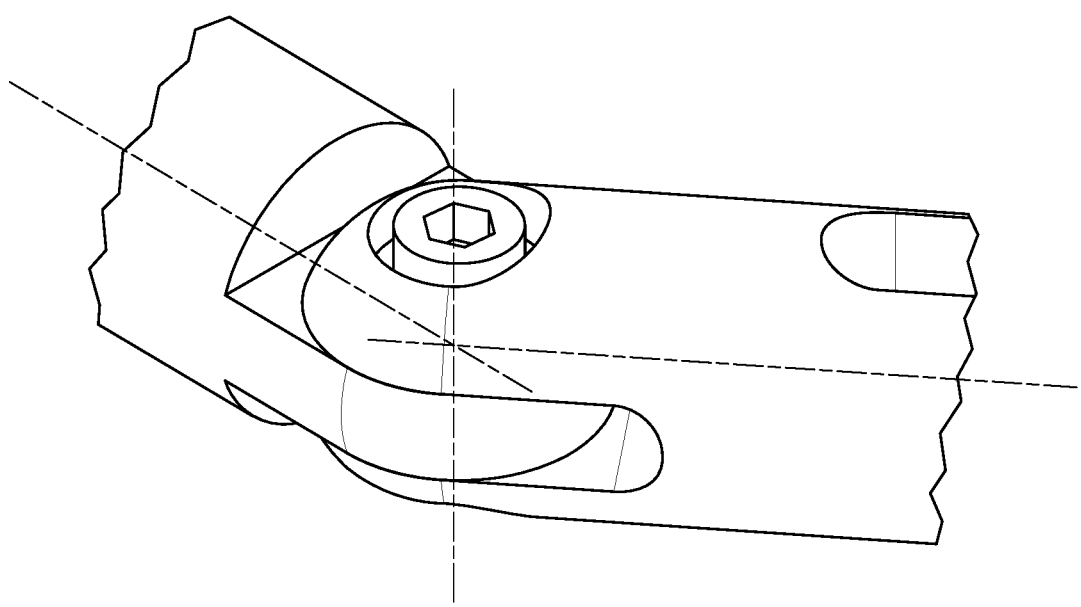
FIG. 4E is a closeup view of the area bounded by dashed lines in FIG. 4C.

At the opposite side of the first arm 250a, the bifurcated end 270 comprises first and second cantilevered members 271 and 273 and a slot 272 (FIG. 4D) extending in an axial direction between the first and second cantilevered members 271 and 273. In the embodiment shown, the slot 272 is dimensioned to receive a first mating tab 280a projecting from an end of the horizontal link 302. Referring to FIG. 4D, openings 274a and 274b may be formed through the first and second cantilevered members 271 and 273, respectively, and extend in a radial direction perpendicular to the longitudinal axis of the first arm 250a. Similarly, an opening 281 may be formed through the first mating tab 280a and extend in the same radial direction. This opening 281 is dimensioned and positioned to align with the openings 274a and 274b of the cantilevered members 271 and 273 when the first mating tab 280a is fully extended into the slot 272. In this manner, the respective openings 274a, 274b, and 281 of the bifurcated end 270 and the first mating tab 280 may be aligned and dimensioned to receive a fastener 290 therethrough to removably secure the first arm 250a to the horizontal link 302.

Referring to FIG. 4D, the fastener 290 may comprise an unthreaded shoulder 291a and a threaded portion 291b extending therefrom that is configured to rotatably engage with a hex nut 290b disposed on an opposing side of bifurcated end 270. In this manner, the fastener 290 may be extended through the respective openings 274a, 274b, and 281 of the bifurcated end 270 and the mating tab 280a such that the threaded portion 291b projects into a recess 274c formed in the second cantilevered member 270b, whereupon the hex nut 290b may be fastened thereto to removably secure the first arm 250a to the horizontal link 302.

In the illustrated example, the unthreaded shoulder 291a defines a smooth rounded surface 291 which enables the horizontal link 302 or the first arm 250a to rotate about the rounded surface 291 when force is applied to either of the horizontal link 302 or the first arm 250a, e.g., when the user applies force to change the orientation of either or both. In this manner, the fastener 290 according to this embodiment may also define a second pivot axis PA2 (FIG. 4G) of the articulating arm assembly 200 such that the horizontal link 302 or the first arm 250a (and thus the yoke assembly) may be rotated in a horizontal plane, as shown. In embodiments wherein the fastener 290 of FIG. 4D is used to define a pivot axis, it is contemplated that the fastener 290, the mating tab 280a and/or the slot 272 of the bifurcated end 270 (or the respective openings thereof) may be dimensioned to create frictional resistance (to relative motion of one component to the other) to preclude the horizontal link 302 and/or the first arm 250a from freely rotating, absent an external force applied by the user to change the orientation thereof. Similarly, another fastener (e.g., 290 in FIG. 4C) may be extended through a first bifurcated end 270a (FIG. 4C) of the second arm 250b and through an opposing mating tab 280b (FIG. 4C) of the horizontal link 302 to connect the second arm 250b to the horizontal link 302. In some embodiments, it is contemplated that the fastener 290 may be utilized to define a third pivot axis PA3 (FIG. 4G) of the articulating arm assembly 200.

Yet, in other embodiments, it is contemplated that that another type of fastener (e.g., a self-locking type) may be utilized to attach the arms 250a and 250b to the link 302 to preclude the arms and/or the link from rotating. In this manner, a wide variety of configurations are contemplated for connecting the arms and the links of the articulating arm assembly 200.

Referring to FIG. 4C, the second arm 250b may include a second bifurcated end 270b that is oriented 90° relative to the first bifurcated end 270a thereof. In this manner, the orientation of the second bifurcated end 270b allows the articulating arm assembly 200 to extend upwardly (FIG. 4A), e.g., to change directions. In other embodiments, it is contemplated that the orientation may differ from that which is shown (e.g., when another angle other than 90° is chosen) without departing from the scope of the present disclosure. Moreover, a fastener (e.g., 290 in FIG. 4D) may be extended through the second bifurcated end 270b and through a mating tab 280 (FIG. 4F) of the first vertical link 304 to pivotally and removably connect the second arm 250b (FIG. 4C) to the first vertical link 304 (FIG. 4F) and define a fourth pivot axis PA4 (FIGS. 4G and 4H) of the articulating arm assembly 200, e.g., such that the yoke assembly 400 may pivot in a first vertical plane, as shown.

Figure 4F:
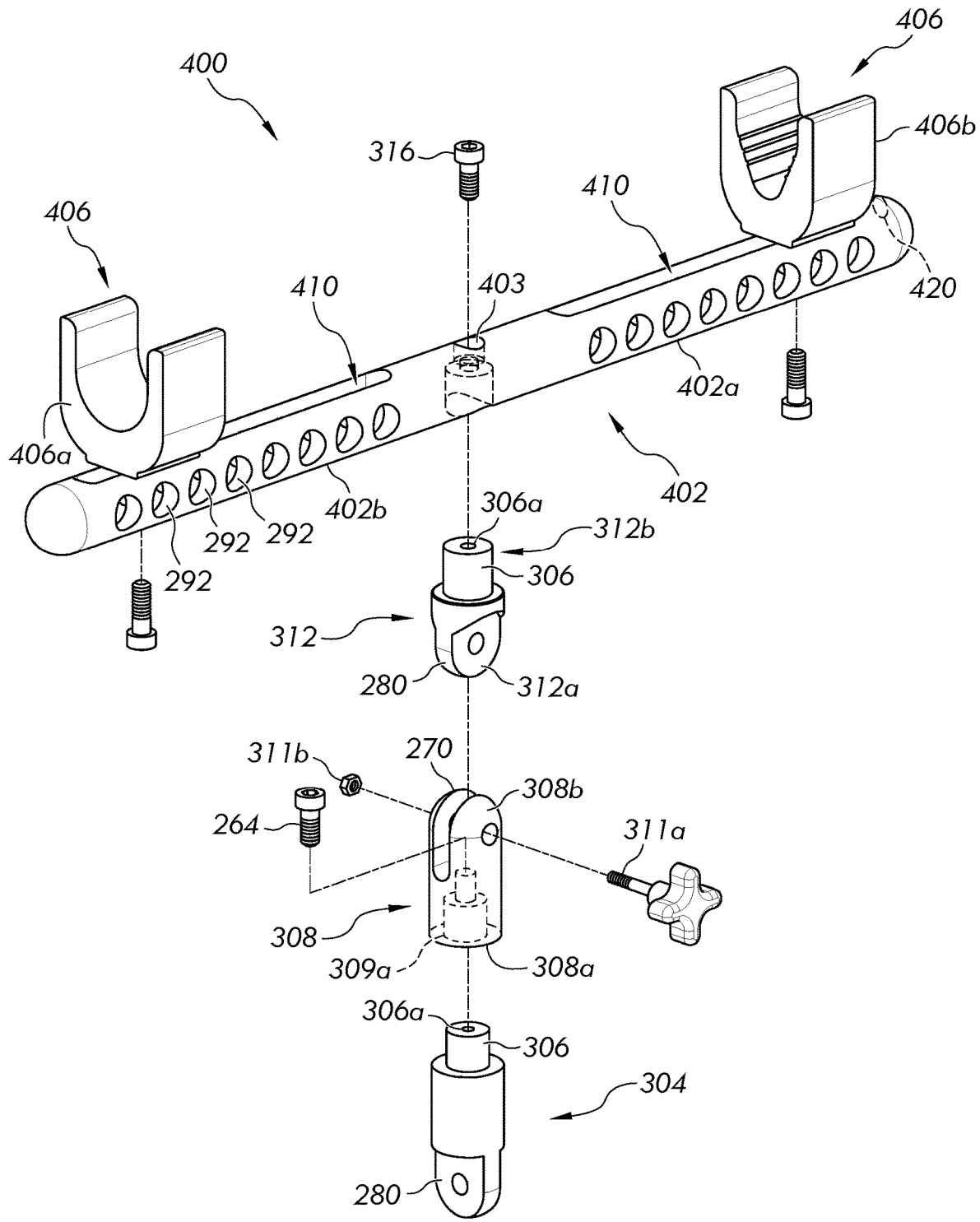
FIG. 4F is an enlarged, exploded perspective view of the yoke assembly of FIG. 4A shown in relation to links.
Figure 4G:
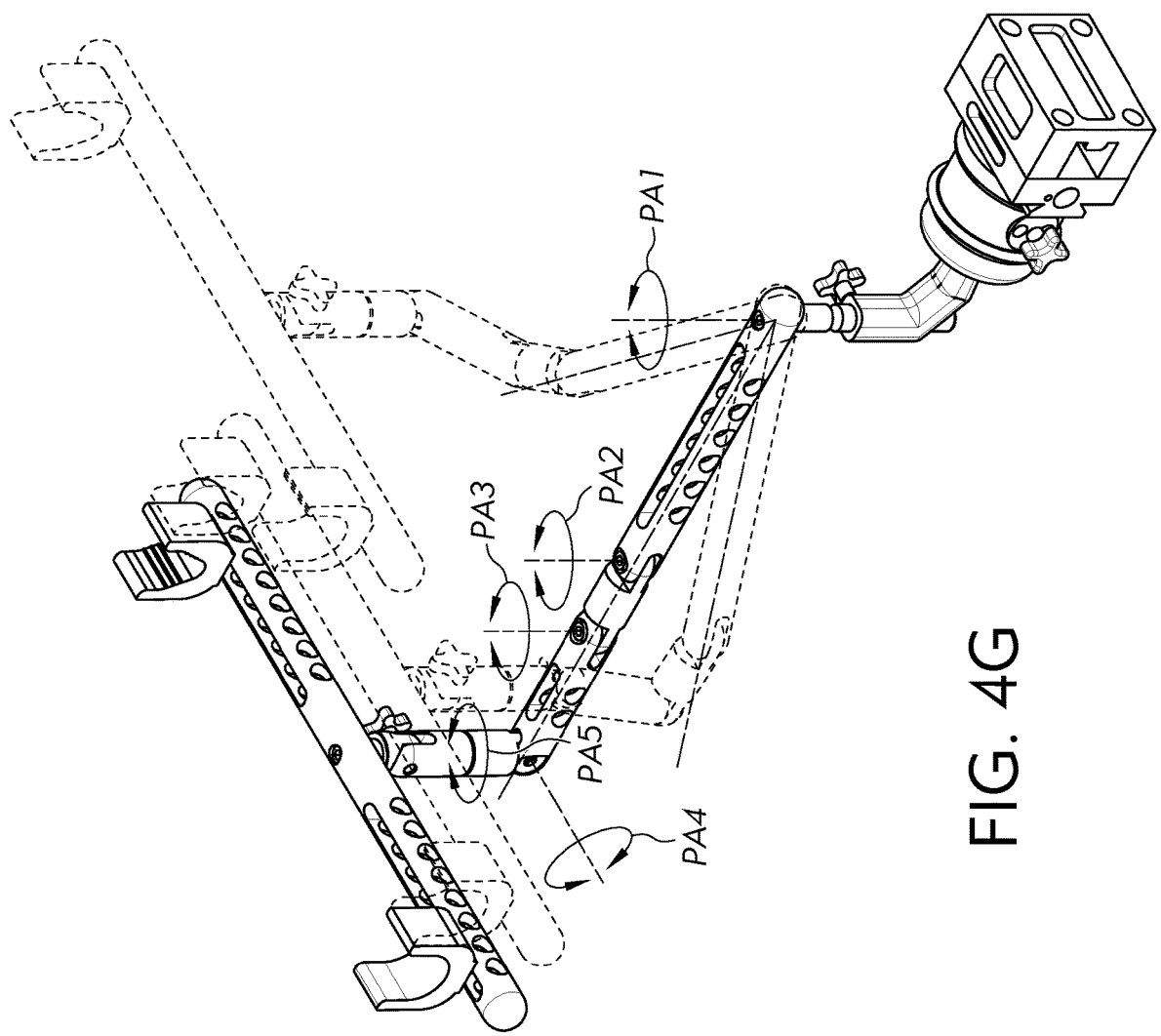
FIG. 4G is a rear perspective view of the shooting rest assembly of FIG. 1 with multiple example positions shown in phantom.
Figure 4H:
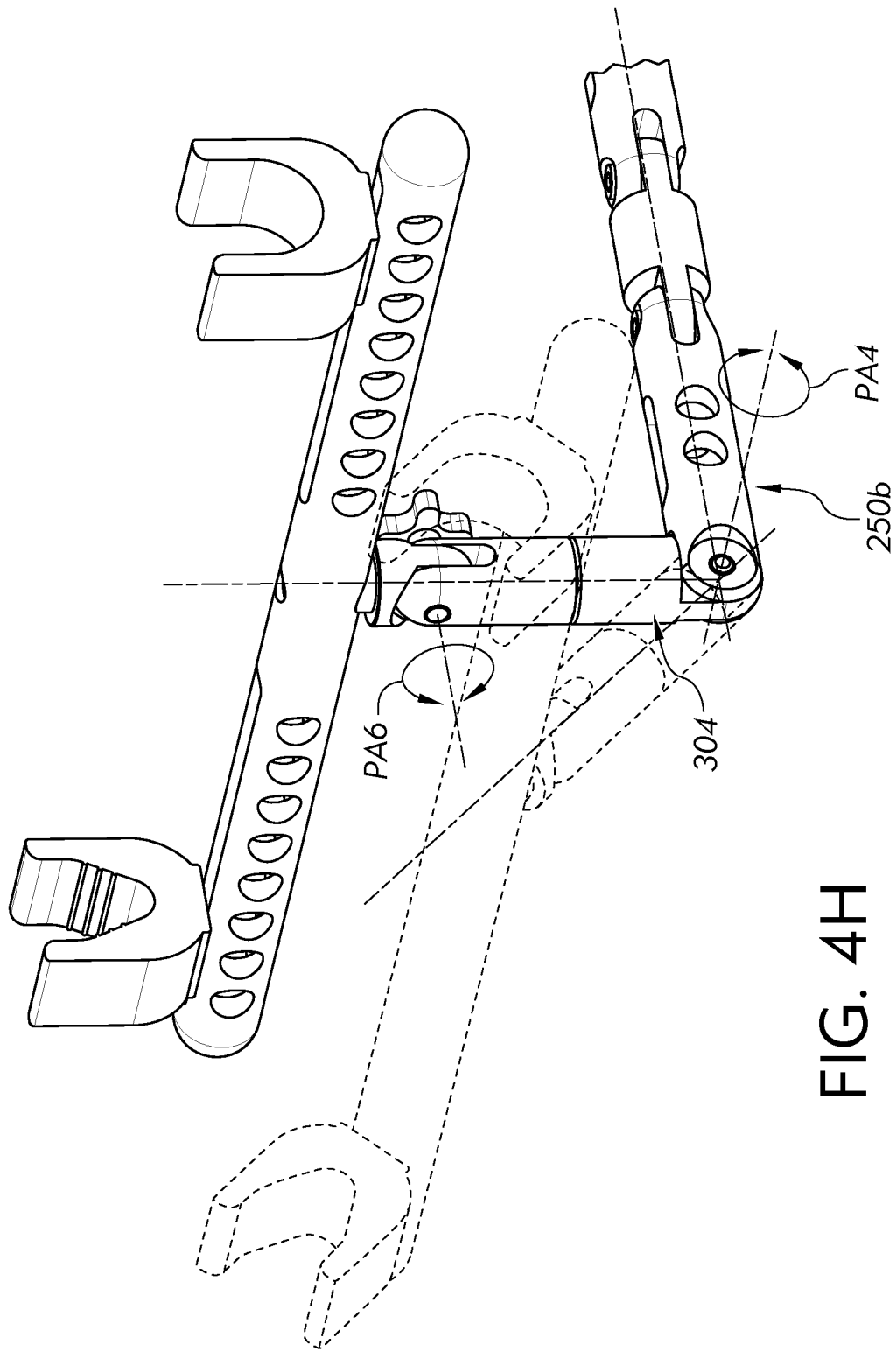
FIG. 4H is a closeup, perspective view of the yoke assembly and a partial, closeup perspective view of the articulating arm assembly of FIG. 4A with multiple example positions shown in phantom.

With reference to FIG. 4F, the first vertical link 304 may define a smooth partial rod or pin 306 extending upwardly at an opposing end of the link 304 (opposite the mating tab 280) that is dimensioned to be received by another opening 309a (e.g., a counterbored hole as shown) formed in a first end 308a of the second vertical link 308. In some embodiments, the pin 306 and the opening 309a may be configured to pivotally connect the first vertical link 304 to the second vertical link 308 and establish a fifth pivot axis PA5 (FIG. 4G) of the articulating arm assembly 200, e.g., such that the yoke assembly 400 may be pivoted in a horizontal plane. The pin 306 (FIG. 4F) may define an opening 306a therein that extends axially and is dimensioned to receive a fastener 264 extended through the opening 309a of the second vertical link 308 to removably connect the second vertical link 308 to the first vertical link 304. The second vertical link 308 may include a second end 308b defining a bifurcated end 270 that may be configured to pivotally connect the second vertical link 308 to the swivel link 312.

The swivel link 312 embodies a structural element that pivotally and removably connects the yoke assembly 400 to the articulating arm assembly 200. Specifically, the swivel link 312 may include a first end 312a comprising a mating tab 280 and a second end 312b comprising a pin 306. The first end 312a may be extended into the bifurcated end 270 of the second vertical link 308 and fastened thereto via a fastener 311a to pivotally secure the yoke assembly 400 to the articulating arm assembly 200. In such embodiments, it is contemplated that a recess (not shown) may be formed in the bifurcated end 270 (in a cantilevered member thereof) of the second vertical link 308 for receiving a hex fitting 311b therein. In such embodiments, the hex fitting 311b may be dimensioned and positioned to engage the fastener 311a to removably connect the swivel link to the second vertical link, e.g., to avoid theadably engaging an opening in the bifurcated end 270, for example, in such embodiments wherein the fastener 311a and the vertical link 308 are made from dissimilar metals (e.g., stainless and aluminum). Moreover, in such embodiments, the swivel link 312 may define a sixth pivot axis PA6 (FIG. 4H) of the articulating arm assembly 200 such that the yoke assembly 400 may pivot in a vertical plane. The fastener 311a may comprise a winged knob to facilitate securing or removing the fastener 311a, for example, when it is desired to change and fix the orientation of the yoke assembly 400 relative to the articulating arm assembly 200.

With reference to FIG. 4F, the yoke assembly 400 may comprise an elongated rod 402 including a first portion 402a and a second portion 402b opposing the first portion 402a. A pair of cradles 406 are removably secured to the first and second portions 402a and 402b, respectively. In some embodiments, the cradles 406 may be manufactured from an elongated extrusion and cut to dimension. In the embodiment shown, a first cradle 406a may define a substantially U-shaped recess, for example, to receive and firmly support the barrel of a gun (FIG. 5A) or crossbow (FIG. 6) therein.

Conversely, a second cradle 406b (FIG. 4F) may define a substantially V-shaped recess therein, for example, to receive and firmly support the tail stock (FIG. 5B) of the gun or crossbow (FIG. 6) therein. It is contemplated that an impediment surface (e.g., a rubber inlay) may be disposed in or about the recesses of the first and second cradles 406a and 406b to prevent the weapon from sliding therethrough and/or to protect the weapon from abrasion therewith.

With reference to FIG. 4F, slots 410 may extend through the respective first and second portions 402a and 402b and define tracks for adjusting the position of the respective cradles 406a and 406b relative to the rod 402, for example, when it is necessary to adjust distance therebetween based on the length of the particular weapon mounted thereto. Lastly, an opening 403 may extend through a center of the rod 402 and be dimensioned to receive the pin 306 of the swivel link 312 therein. A fastener 316 may be extended through the opening 403 and into the other corresponding opening 306a of the swivel link 312 to removably secure the yoke assembly 400 to the articulating arm assembly 200 (FIG. 4A). Another opening 420 may be formed in the elongated rod to define an anchor point for a safety tether (not shown) affixed to the weapon, for example, to prevent the weapon from falling to the ground surface below.

Lastly, in the illustrated embodiments, each of the arms 250a and 250b (FIG. 4A) of the articulating arm assembly 200 and the rod 402 (FIG. 4F) of the yoke assembly 400 may define a plurality of through holes 292 (FIG. 4C) extending therethrough for reducing the total weight of the shooting rest assembly 10. Likewise, slots 261 (FIG. 4C) may be formed through the first and second arms 250a and 250b for weight reduction purposes. Yet, it is conceivable that the articulating arm assembly 200 and the yoke assembly 400 may take on different shapes and forms, and that the various arms and links (or features thereof) may be reversed, substituted, or replaced with other features without departing from the scope of the present disclosure. For example, the horizontal link 302 may define bifurcated ends 270 at opposing ends thereof instead of mating tabs 280. As another example, the articulating arm assembly 200 may only comprise one arm (the combination of 250a and 250b) and one link (e.g., only a swivel link). As noted above, it is also contemplated that the arms and the links do not define pivot axes, in such embodiments wherein fastening the arms, the links, and the yoke assembly to each other precludes rotation thereof. In this manner, it is contemplated that the articulating arm and yoke assemblies may take on a variety of different forms or configurations without departing from the scope of the present disclosure.

In some embodiments, it is contemplated that the various components of the shooting rest assembly 10 may be made from a rigid, corrosion resistant material suitable for an outdoor environment, for example, 6061 T-6 aluminum or 174PH stainless steel. However, it should be understood that the components of the shooting rest assembly be made from different materials without departing from the scope of the present disclosure. Moreover, in such embodiments wherein components of the shooting rest assembly are made from aluminum, it is contemplated that the aluminum may be anodized to enhance the aesthetic appeal of the shooting rest assembly or make the shooting rest assembly less perceptible to wild game, for example, with a green camouflage and the like.

It is also contemplated that any or all of the components (e.g., the swivel assembly, the articulating arm assembly, the yoke assembly) may be machined (e.g., CNC machining) to maintain dimensional tolerances for enhancing the quality of the shooting rest assembly.

In summary, the shooting rest assemblies according to the various inventions described herein effectively enhance the likelihood of tracking and/or shooting moving wild game via a swivel assembly featuring a distinctive resistance control mechanism and an articulating arm assembly that increases the overall range of movement of the shooting rest assembly.

While the various inventions disclosed herein have been described with reference to the example embodiments described above, it should be understood that modifications and alterations will occur to others upon a reading and understanding of this specification without departing from the spirit and scope of the invention set forth in the appended claims. Example embodiments incorporating one or more aspects of the invention are intended to include all such modifications and alterations insofar as they come within the scope of the appended claims and their equivalents. In this manner, it is contemplated that aspects of one embodiment may be combined with another.

Moreover, it should be understood that the order of discussion is not limiting and is only provided for ease of describing the various examples of a shooting rest assembly disclosed herein. Similarly, the positions (e.g., upper, lower) or rotational orientations (e.g., clockwise, counter clockwise) described herein are provided for ease of disclosing the illustrated embodiments. In this manner, it should be appreciated that positions and/or orientations may be different in other embodiments without departing from the scope of the present disclosure. Moreover, in the examples shown, some features of the present disclosure are described in terms of their spatial relationship to other features using relative language, such as, rear surface and front surface. It should be appreciated that the spatial relationships may differ in other embodiments without departing from the scope of the present disclosure, for example, when viewing the shooting rest assembly from a different orientation.

The invention claimed is:

1. A swivel assembly for a shooting rest, the swivel assembly comprising:
   a housing comprising a cavity containing a fluid therein, wherein the housing defines a seat and a first opening extending into the cavity, wherein the housing includes a first end and a second end spaced apart by a side wall;
   a piston dimensioned to be received by the seat and defining a spherical-shaped portion;
   a cup defining a concaved inner surface corresponding to the spherical-shaped portion of the piston;
   a resistance control comprising a rod extending into the first opening and operable to compress the fluid in the cavity to variably modulate friction between the spherical-shaped portion of the piston and the concaved inner surface of the cup; and
   a bracket assembly configured to removably engage with the first end of the housing, said bracket assembly including a first member and a second member, wherein the first member includes a vertical wall with a pair of legs extending therefrom in a direction perpendicular to the vertical wall, wherein said pair of legs are configured to be secured to the second member to define an enclosed channel, said channel being dimensioned to receive and engage with a support structure to secure the swivel assembly to the support structure.

2. The swivel assembly according to claim 1, wherein the housing defines:
   a raised annular portion extending about and adjacent to a periphery of the first end, and
   an annular wall extending upwardly and spaced concentrically inward relative to the raised annular portion, and wherein the annular wall delimits the seat.

3. The swivel assembly according to claim 2, wherein the raised annular portion and the annular wall collectively define an annular recess therebetween, wherein the annular recess is configured to accommodate a distal end of the cup when the cup is secured to the housing.

4. The swivel assembly according to claim 1, wherein the swivel assembly further comprises a flange removably attached to the housing and configured to secure the piston and the cup thereto.

5. The swivel assembly according to claim 4, wherein the flange defines an opening extending between a first end and a second end thereof, said opening being shaped and dimensioned to mesh with an outer surface of the cup when the flange is removably attached to the housing.

6. The swivel assembly according to claim 1, wherein the housing comprises a cylindrical-shaped body defining a slot extending between opposing sides thereof, said slot being dimensioned to slidably receive a rail therethrough.

7. The swivel assembly according to claim 1, wherein the rod comprises a threaded portion, wherein the resistance control comprises a body defining a threaded opening configured to rotatably engage the threaded portion of the rod, and the housing defines a depression for receiving the body, wherein a knob is attached to an end of the rod and is operable to extend or retract the rod relative to the body of the resistance control and into or out of the cavity, respectively.

8. The swivel assembly according to claim 7, wherein the seat defines a second opening extending into the cavity, wherein rotating the knob in a first direction extends the rod into the cavity and rotating the knob in a second direction retracts the rod out of the cavity, whereby extending the rod into the cavity compresses the fluid therein against the piston, thereby biasing the piston into frictional engagement with the cup.

9. The swivel assembly according to claim 1, wherein the cup is an integral part of a support body, wherein said support body comprises a holder extending therefrom.

10. A shooting rest assembly comprising:
   a swivel assembly including:
      a housing comprising a cavity containing a fluid therein, wherein the housing includes a first end and a second end spaced apart by a side wall, wherein the side wall defines a first opening extending into the cavity and the first end defines a second opening extending into the cavity;
- a bracket assembly including a first member and a second member collectively defining an enclosed channel therebetween, said channel being dimensioned to receive a support structure therethrough to removably secure the bracket assembly to the support structure, wherein the second member is configured to removably engage the first end of the housing to secure the housing to the bracket assembly;
- a piston defining a spherical-shaped portion and including a stem extending from the piston on an opposing side of the spherical-shaped portion,
- a pivotable support body comprising a holder extending therefrom and a cup defining a concaved inner surface corresponding to the spherical-shaped portion of the piston, and
- a resistance control comprising a rod extending into the cavity through the first opening and operable to compress the fluid in the cavity to variably modulate friction between the spherical-shaped-portion of the piston and the concaved inner surface of the cup;
- an arm removably attached to the holder of the pivotable support body; and
- a yoke assembly removably attached to the arm and configured to support a weapon thereon, wherein the yoke assembly includes:
- an elongated rod including a first portion and a second portion opposing the first portion, wherein the first portion and the second portion each define a track dimensioned to receive a cradle, wherein the cradle is configured to be moved about the track to adjust a position of the cradle along a longitudinal axis of the rod.

11. The shooting rest assembly according to claim 10, wherein the second end of the housing comprises a slot extending therethrough, and wherein the
wherein the second member comprises a rail dimensioned to be received by the slot.

12. The shooting rest assembly according to claim 11, wherein the second member comprises a protrusion extending therefrom that is shaped and dimensioned to engage with the support structure.

13. The shooting rest assembly according to claim 10, wherein the holder defines an opening, and wherein the shooting rest assembly further comprises a mounting rod dimensioned to be received by the opening of the holder to removably attach the arm to the swivel assembly, said mounting rod defining a plurality of circumferential grooves corresponding to a plurality of height adjustment positions.

14. The shooting rest assembly according to claim 10, wherein the arm comprises a first arm and a second arm pivotally connected via a link, wherein the one of the first arm and the link comprises a bifurcated end defining a slot, and wherein the other of the first arm and the link comprises a mating tab dimensioned to be received by the slot of the bifurcated end to pivotally connect the first arm to the link such that the first arm, the second arm, and the link are disposed about a common longitudinal axis, wherein the first arm and the second arm are each configured to pivot relative to the link in a horizontal plane.

15. The shooting rest assembly of claim 10, wherein the arm comprises a first arm and a second arm pivotally connected via a first link, and wherein the second arm is pivotally connected to the elongated rod via a swivel link and a second link, wherein the swivel link and the second link collectively define a pivot axis to enable the elongated rod to pivot in a vertical plane.

16. A shooting rest assembly comprising:
- a swivel assembly including:
  - a housing with a first end and a second end spaced apart by a side wall,
  - a pivotable support body secured to the housing, wherein the pivotable support body includes a holder extending therefrom defining an opening;
- a bracket assembly including:
  - a first member and a second member defining a channel therebetween, said channel being dimensioned to receive a support structure therethrough to removably secure the bracket assembly to the support structure, wherein the second member is configured to engage the second end of the housing to removably secure the swivel assembly to the bracket assembly;
- an articulating arm assembly including:
  - a mounting arm,
  - at least one arm pivotally connected to the mounting arm, and
  - a swivel link pivotally connected to the at least one arm; and
- a yoke assembly including an elongated rod pivotally connected to the swivel link, wherein the rod includes a first portion and a second portion opposing the first portion, wherein the first portion and the second portion each define a track dimensioned to receive a cradle therefrom, wherein the cradle is configured to be moved about the track to adjust a position of the cradle along a longitudinal axis of the rod.

* * * * *